US009113029B2

(12) United States Patent
Eom et al.

(10) Patent No.: US 9,113,029 B2
(45) Date of Patent: Aug. 18, 2015

(54) GLASSES APPARATUS AND METHOD FOR CONTROLLING GLASSES APPARATUS, AUDIO APPARATUS AND METHOD FOR PROVIDING AUDIO SIGNAL AND DISPLAY APPARATUS

(71) Applicant: SAMSUNG ELECTRONICS CO., LTD., Suwon-si (KR)

(72) Inventors: Ki-wan Eom, Hwaseong-si (KR); Sang-yoon Kim, Seoul (KR); Woo-jung Lee, Incheon (KR); Jeong-su Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/105,422

(22) Filed: Dec. 13, 2013

(65) Prior Publication Data

US 2014/0168349 A1    Jun. 19, 2014

(30) Foreign Application Priority Data

Dec. 13, 2012  (KR) .................. 10-2012-0145441
Jul. 17, 2013   (KR) .................. 10-2013-0084031

(51) Int. Cl.
*H04N 7/14* (2006.01)
*H04N 5/04* (2006.01)
(Continued)

(52) U.S. Cl.
CPC ............... *H04N 7/142* (2013.01); *G02B 27/01* (2013.01); *G02B 27/017* (2013.01); *H04N 5/04* (2013.01);
(Continued)

(58) Field of Classification Search
CPC ......... H04N 7/142; H04N 5/04; H04N 13/00; H04R 25/604; G02B 27/01
USPC ........ 345/7, 633, 8; 348/14.03, 558; 351/121, 351/151, 209, 41, 153, 158; 370/285; 455/456.1, 575.2, 556.1
See application file for complete search history.

(56) References Cited

U.S. PATENT DOCUMENTS 6,929,365 B2 *  8/2005  Swab et al. ................... 351/153
7,013,009 B2 *  3/2006  Warren ..................... 379/420.01

(Continued)

FOREIGN PATENT DOCUMENTS

| JP | 2003-91353 A | 3/2003 |
| KR | 10-2004-0047692 A | 6/2004 |
| KR | 10-0594117 B1 | 6/2006 |

OTHER PUBLICATIONS

International Search Report (PCT/ISA/210), dated Apr. 16, 2014, issued by the International Searching Authority in counterpart International Patent Application No. PCT/KR2013/011609.
(Continued)

*Primary Examiner* — Gerald Gauthier
(74) *Attorney, Agent, or Firm* — Sughrue Mion, PLLC

(57) ABSTRACT

A glasses apparatus and a controlling method thereof, and a display apparatus are provided. The glasses apparatus is configured to operate with the display apparatus, and includes a communicator configured to perform communication with the display apparatus; an osteophony speaker configured to output audio received from the display apparatus; and a controller configured to control the communicator to receive contents audio from the display apparatus if the display apparatus provides a contents image, and to receive call audio from the display apparatus if the display apparatus performs a call function with an external user, and to output one of the received contents audio and call audio to the osteophony speaker.

34 Claims, 25 Drawing Sheets

(51) Int. Cl.
  *H04R 25/00* (2006.01)
  *G02B 27/01* (2006.01)
  *H04N 13/04* (2006.01)

(52) U.S. Cl.
  CPC ....... *H04N 13/0438* (2013.01); *H04N 13/0497* (2013.01); *H04R 25/604* (2013.01); *G02B 2027/014* (2013.01); *G02B 2027/0134* (2013.01); *G02B 2027/0178* (2013.01); *G02B 2027/0187* (2013.01); *H04N 2213/008* (2013.01)

(56) References Cited

U.S. PATENT DOCUMENTS

| | | | |
|---|---|---|---|
| 7,079,876 B2 * | 7/2006 | Levy | 455/575.2 |
| 7,123,215 B2 | 10/2006 | Nakada | |
| 7,458,682 B1 * | 12/2008 | Lee | 351/158 |
| 7,760,898 B2 * | 7/2010 | Howell et al. | 381/327 |
| 7,762,665 B2 * | 7/2010 | Vertegaal et al. | 351/209 |
| 8,011,783 B1 * | 9/2011 | Leblang | 351/158 |
| 8,184,067 B1 * | 5/2012 | Braun et al. | 345/7 |
| 8,325,278 B2 * | 12/2012 | Oku | 348/558 |
| 8,417,261 B2 * | 4/2013 | Huston | 455/456.1 |
| 8,430,507 B2 * | 4/2013 | Howell et al. | 351/158 |
| 8,465,151 B2 * | 6/2013 | Howell et al. | 351/121 |
| 8,500,271 B2 * | 8/2013 | Howell et al. | 351/158 |
| 8,553,910 B1 * | 10/2013 | Dong et al. | 381/151 |
| 8,743,145 B1 * | 6/2014 | Price | 345/633 |
| 8,818,466 B2 * | 8/2014 | Brunton et al. | 455/575.2 |
| 2004/0096078 A1 * | 5/2004 | Lin | 381/333 |
| 2004/0104864 A1 | 6/2004 | Nakada | |
| 2005/0213026 A1 * | 9/2005 | Da Pra' | 351/158 |
| 2005/0248719 A1 * | 11/2005 | Howell et al. | 351/41 |
| 2005/0275714 A1 | 12/2005 | Ishikawa et al. | |
| 2006/0001827 A1 * | 1/2006 | Howell et al. | 351/41 |
| 2006/0003803 A1 * | 1/2006 | Thomas et al. | 455/556.1 |
| 2006/0023158 A1 * | 2/2006 | Howell et al. | 351/41 |
| 2006/0061544 A1 | 3/2006 | Min et al. | |
| 2006/0132382 A1 * | 6/2006 | Jannard | 345/8 |
| 2006/0209730 A1 * | 9/2006 | Bautista | 370/285 |
| 2007/0046887 A1 * | 3/2007 | Howell et al. | 351/41 |
| 2010/0045928 A1 * | 2/2010 | Levy | 351/158 |
| 2010/0110368 A1 | 5/2010 | Chaum | |
| 2012/0300956 A1 * | 11/2012 | Horii | 381/71.6 |
| 2014/0168349 A1 * | 6/2014 | Eom et al. | 348/14.03 |

OTHER PUBLICATIONS

Written Opinion (PCT/ISA/237), dated Apr. 16, 2014, issued by the International Searching Authority in counterpart International Patent Application No. PCT/KR2013/011609.

* cited by examiner

FIG. 13A
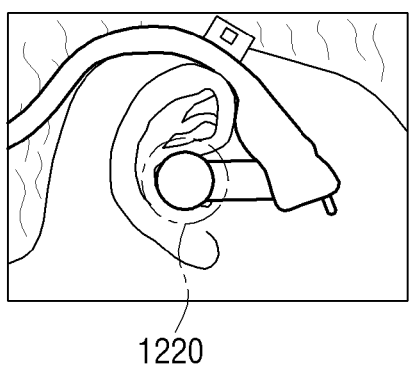
1220
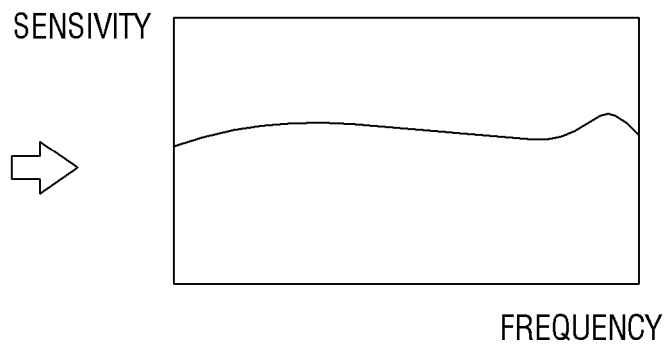
SENSIVITY
FREQUENCY

GLASSES APPARATUS AND METHOD FOR
CONTROLLING GLASSES APPARATUS,
AUDIO APPARATUS AND METHOD FOR
PROVIDING AUDIO SIGNAL AND DISPLAY
APPARATUS

CROSS-REFERENCE TO RELATED
APPLICATIONS

This application claims priority from Korean Patent Application No. 10-2012-0145441, filed in the Korean Intellectual Property Office on Dec. 13, 2012, and Korean Patent Application No. 10-2013-0084031, filed in the Korean Intellectual Property Office on Jul. 17, 2013, the disclosures of which are incorporated herein by reference in their entirety.

BACKGROUND

1. Field

Methods and apparatuses consistent with the exemplary embodiments relate to a glasses apparatus, a method for controlling the glasses apparatus, and a display apparatus, and more particularly, to a glasses apparatus which performs various operations using an osteophony speaker and a controlling method thereof, an audio apparatus, an audio signal providing method, and a display apparatus thereof.

2. Description of the Related Art

Recently, as various functions (for example, three-dimensional (3D) functions and game functions) are being adopted for display apparatuses, 3D glasses apparatuses are being provided that operate in an interlocked manner with display apparatuses.

Specifically, in the related art, a glasses apparatus may be provided with a speaker or audio output terminal (for example, an earphone terminal etc.), so as to provide various audio such as contents audio or call audio to a user.

However, in the case of providing call audio to a user using a speaker while performing a video call, an echo phenomenon occurs where the call audio is input to the microphone again. In addition, in the case of providing call audio to a user using an earphone, there is a problem that the user may not hear other sounds besides the call audio.

Therefore, there is a need for a way to provide call audio or contents audio to a user by adopting a osteophony speaker in a glasses apparatus so as to perform a video call. In addition, there is required a way for the glasses apparatus to perform various functions using an osteophony speaker.

SUMMARY

Exemplary embodiments provide a glasses apparatus which provides audio to a user using an osteophony speaker and a controlling method thereof, an audio apparatus and an audio signal providing method, and a display apparatus.

According to an aspect of an exemplary embodiment, there is provided a glasses apparatus configured to operate with a display apparatus, the glasses apparatus including a communicator configured to perform communication with the display apparatus; an osteophony speaker configured to output audio received from the display apparatus; and a controller configured to control the communicator to receive contents audio related to a contents image from the display apparatus if the display apparatus provides a contents image, and to receive call audio from the display apparatus if the display apparatus performs a call function with an external user, and to output one of the received contents audio and call audio to the osteophony speaker.

The glasses apparatus may further include a microphone configured to receive a user's voice for controlling the display apparatus; and the controller may control the communicator to transmit the user's voice received through the microphone to the display apparatus.

The glasses apparatus may further include a switch configured to select audio being output from the osteophony speaker, and the controller may be configured to control the communicator to transmit a signal requesting the display apparatus to transmit the contents audio, if the switch is selected while receiving the call audio from the display apparatus.

The glasses apparatus may further include an audio signal processor configured to perform signal processing for improving frequency characteristics of the received audio; and the controller may be configured to control the audio signal processor to determine a type of the audio received through the communicator, and to modify frequency characteristics differently according to the received audio type.

The glasses apparatus may further include a motion sensor configured to sense a user's motion, and the controller may be configured to control the communicator to transmit the sensed user's motion information to the display apparatus.

The glasses apparatus may further include a speed sensor configured to sense an object's speed; and the controller may be configured to output an alarm audio through the osteophony speaker if the object's speed sensed by the speed sensor is equal to or greater than a predetermined value.

The glasses apparatus may further include a glasses unit configured to display an image; and the controller may be configured to control the communicator to receive contents being reproduced in an authenticated external apparatus if the external apparatus is authenticated through the communicator, and to control the glasses unit and osteophony speaker to output the received contents.

The glasses apparatus may further include a body index sensor configured to sense at least one of a brainwave, body temperature, and blood pressure of a user; and the controller may be configured to control the osteophony speaker to output a low frequency vibration having a predetermined frequency if one of the brainwave, body temperature, and blood pressure sensed by the body index sensor satisfies a predetermined condition.

The controller may be configured to control the communicator to be time-synchronized with contents being reproduced in the display apparatus, and to transmit information on the at least one of the brainwave, body temperature, and blood pressure sensed by the body index sensor to the display apparatus while the contents is reproduced.

The glasses apparatus may be shutter glasses for viewing a 3D image.

According to an aspect of another exemplary embodiment, there is provided a method of controlling a glasses apparatus configured to operate with a display apparatus, the method including receiving contents audio related to a contents image from the display apparatus if the display apparatus provides a contents image, and receiving call audio from the display apparatus if the display apparatus performs a call function with an external user; and outputting one of the received contents audio and call audio to an osteophony speaker.

The method may further include receiving a user's voice for controlling the display apparatus through a microphone; and transmitting the user's voice received through the microphone to the display apparatus.

The method may further include transmitting a signal requesting the display apparatus to transmit contents audio if a user's predetermined command is input while receiving the call audio from the display apparatus.

The method may further include determining a type of the audio received at the receiving step; and modifying frequency response characteristics differently according to a type of the received audio.

The method may further include sensing a user's motion; and transmitting the sensed user's motion to the display apparatus.

The method may further include sensing an object's speed; and outputting san alarm audio through the osteophony speaker if a speed of the sensed object is equal to or greater than a predetermined value.

The method may further include sensing a user's motion, and transmitting the sensed user's motion to the display apparatus.

The method may further include performing authentication with an external apparatus; receiving contents being reproduced in the authenticated external apparatus if the external apparatus is authenticated; and outputting the received contents to a glasses unit and the osteophony speaker.

The method may further include sensing at least one of a user's brainwave, body temperature, pulse and blood pressure; and outputting a low frequency vibration having a predetermined frequency through the osteophony speaker if the at least one of the brainwave, body temperature, pulse and blood pressure sensed by the body index sensor satisfies a predetermined condition.

The method may further include time-synchronizing audio the contents being reproduced in the display apparatus, and transmitting information on the at least one of the brainwave, body temperature, pulse and blood pressure sensed by the body index sensor to the display apparatus while the contents is reproduced.

The glasses apparatus may be shutter glasses for viewing a 3D image.

According to an aspect of another exemplary embodiment, there is provided a display apparatus configured to operate with a glasses apparatus, the display apparatus including a display configured to display an image; a speaker configured to output audio; a communicator configured to perform communication with the glasses apparatus; and when performing a call function with an external user while a contents image is displayed on the display, a controller configured to transmit call audio to the glasses apparatus through the communicator, and to output contents audio corresponding to a contents image through the speaker.

According to an aspect of another exemplary embodiment, there is provided an audio apparatus including a communicator configured to receive a first audio signal from an audio source providing apparatus; an osteophony speaker configured to output the first audio signal; a combination sensor configured to sense whether the audio apparatus is combined with or connected to a glasses apparatus; and a controller configured to control the communicator to stop receiving the first audio signal from the audio source providing apparatus, to receive a second audio signal from a display apparatus configured to operate in an interlocked manner with the glasses apparatus, and to output the second audio signal, if the audio apparatus is determined to be combined to the glasses apparatus through the combination sensor.

The second audio signal being received from the display apparatus may be an audio signal synchronized with an image being displayed in the display apparatus.

The audio apparatus may further include a location sensor configured to sense a location of the osteophony speaker; and an audio signal modifier configured to modify an audio signal; and the controller may be configured to control the audio signal modifier to modify the audio signal according to the location of the osteophony speaker sensed by the location sensor.

The controller may control the audio signal modifier to modify the audio signal to a first modified audio signal if the osteophony speaker is sensed by the location sensor to be located in an ear, and control the audio signal modifier to modify the audio signal to a second modified audio signal if the osteophony speaker is sensed by the location sensor to be located outside the ear.

According to an aspect of another exemplary embodiment, there is provided a method of providing an audio signal of an audio apparatus, the method including receiving a first audio signal from an audio source providing apparatus; outputting the first audio signal through an osteophony speaker; sensing whether or not the audio apparatus is combined with a glasses apparatus; stopping receiving the first audio signal from the audio source providing apparatus and receiving a second audio signal from a display apparatus operating in an interlocked manner with the glasses apparatus, if the audio apparatus is determined to be combined with the glasses apparatus; and outputting the second audio signal through the osteophony speaker.

The second audio signal being received from the display apparatus may be an audio signal synchronized with an image displayed in the display apparatus.

The method may further include sensing a location of the osteophony speaker; and modifying an audio signal according to a location of the sensed osteophony speaker.

The modifying may modify the audio signal to a first modified audio signal if the osteophony speaker is sensed to be located in an ear, and modify the audio signal to a second modified audio signal if the osteophony speaker is sensed to be located outside the ear.

BRIEF DESCRIPTION OF THE DRAWINGS

The above and/or other aspects will be more apparent by describing certain exemplary embodiments with reference to the accompanying drawings, in which:

FIGS. 13A to 13B are graphs illustrating an audio signal modified because a frequency characteristic of an osteophony speaker that should be modified according to a location of an osteophony speaker is different;

DESCRIPTION OF EXEMPLARY EMBODIMENTS

Certain exemplary embodiments are described in higher detail below with reference to the accompanying drawings.

Figure 1:
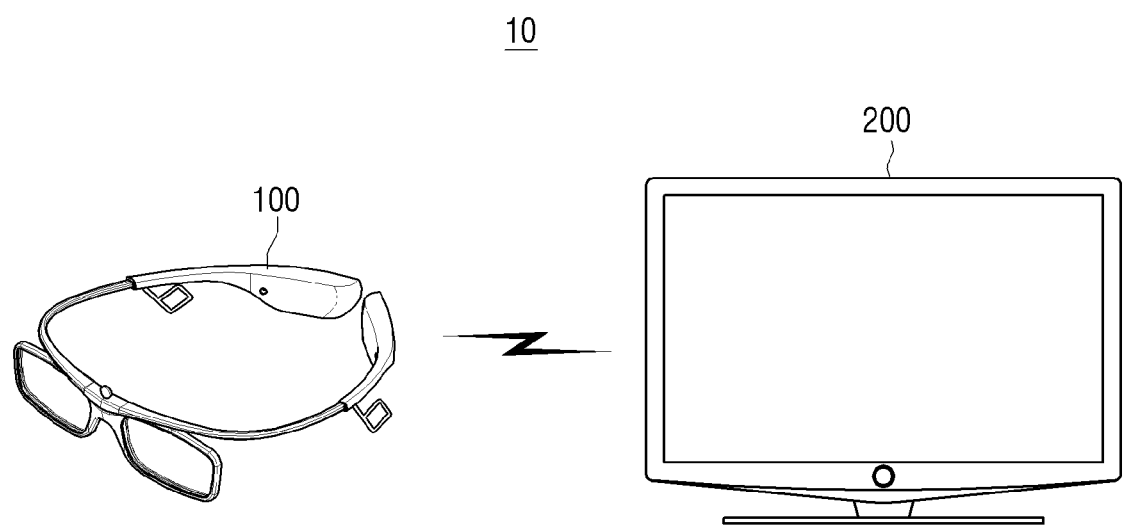
FIG. 1 is a schematic view of a display system, in accordance with an exemplary embodiment.

FIG. 1 is a view illustrating a display system 10 in accordance with an exemplary embodiment. As illustrated in FIG. 1, the display system 10 may include a glasses apparatus 100 and a display apparatus 200. Herein, the display apparatus 200 may be a smart television (TV), but this is just an example, and thus the display apparatus 200 may be embodied in one of various display apparatuses such as a desk top personal computer (PC), tablet PC, notebook PC, and smart phone, etc.

The glasses apparatus 100 operates in an interlocked manner with the display apparatus 200. Specifically, the glasses apparatus 100 may be shutter glasses for viewing 3D contents reproduced in the display apparatus 200. More specifically, in the case where a left eye image of 3D contents output in the display apparatus 200 is displayed, the glasses apparatus 100 may turn on only a left eye shutter of the glasses, turns off a right eye shutter of the glasses, whereas in the case where a right eye image of among 3D contents output in the display apparatus 200 is displayed, the glasses apparatus 100 may turn on only the right eye shutter of the glasses and turn off the left eye shutter of the glasses. Herein, the timing where the left eye image and the right eye image of the 3D contents are displayed may be synchronized with the opening/closing timing of the shutters of the left eye glass and right eye glass of the glasses apparatus 100.

A glasses apparatus 100 according to an exemplary embodiment may not only view the 3D contents reproduced in the display apparatus 200 but also multi-views where a plurality of images are output alternately in the display apparatus 200.

In addition, the glasses apparatus 100 includes an osteophony speaker for outputting audio transmitted from the display apparatus 200. An osteophony speaker is a speaker which includes a vibrator which outputs a sound through vibrations when contacting a portion of a user's body (for example, beneath the ear) to vibrate the bone so that the user may hear a sound.

While the display apparatus 200 reproduces a contents image, the display apparatus 200 transmits contents audio corresponding to the contents image to the glasses apparatus 100. When the contents audio is received from the display apparatus 200, the glasses apparatus 100 outputs the contents audio using the osteophony speaker.

When a call request is received by the display apparatus while the display apparatus reproduces the contents image, the display apparatus 200 stops transmitting the contents audio related to the contents image, and transmits the audio related to the call, and transmitted from an external apparatus (hereinafter referred to as "call audio"), to the glasses apparatus 100. When call audio is received, the glasses apparatus 100 outputs the call audio using the osteophony speaker. The display apparatus 200 may output contents audio with a speaker provided within the display apparatus.

In the case of making a call with a person outside using the osteophony speaker, the user may hear, not only the call audio but also the contents audio output from the display apparatus 200. Therefore, the user is able to make a call with a person outside while viewing contents.

In addition, when a user's voice is received through a microphone provided in the glasses apparatus 100, the glasses apparatus 100 transmits the user's voice to the display apparatus 200. In addition, the display apparatus 200 may transmit the received user's voice to the call counterpart outside.

In addition, the glasses apparatus 100 may provide various services to the user using various sensors and the osteophony speaker. For example, the glasses apparatus 100 may provide a gaming service using a user's motion sensed through a motion sensor. In addition, the glasses apparatus 100 may sense an object's speed and provide an alarm service. In addition, the glasses apparatus 100 may be synchronized with an external apparatus and provide a service for viewing contents reproduced in the external apparatus through the glasses apparatus 100. In addition, the glasses apparatus 100 may sense the user's body index (for example, blood pressure, pulse, brainwave, and temperature etc.) and provide a low frequency vibration service. In addition, the glasses apparatus 100 may sense a user's body index while contents is reproduced, and provide a service of detecting and providing a main screen. Various functions of the glasses apparatus 100 will be explained in more detail with reference to FIGS. 6 to 11 hereinbelow.

Hereinbelow is detailed explanation on the glasses apparatus 100 and the display apparatus 200 for providing audio contents and call audio.

Figure 2:
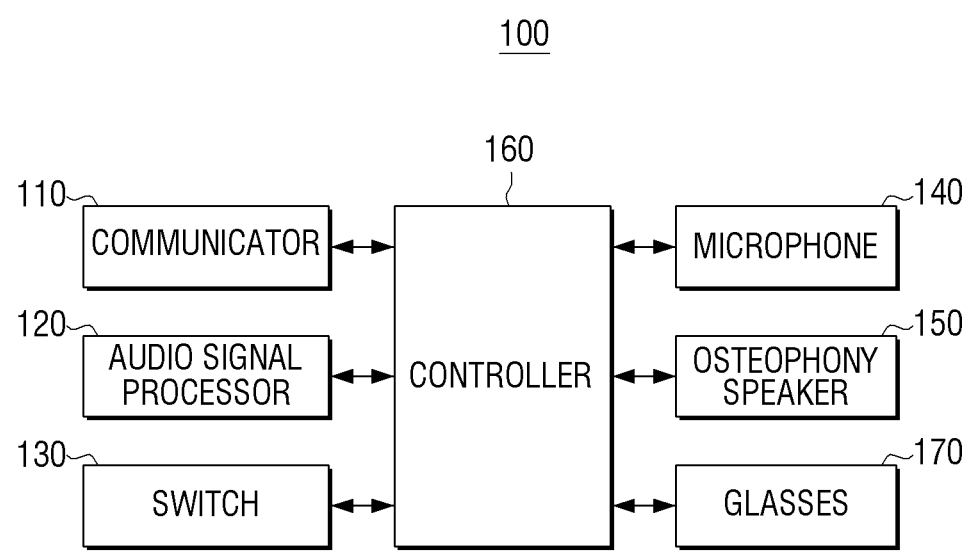
FIG. 2 is a block diagram illustrating a configuration of a glasses apparatus, in accordance with an exemplary embodiment.

FIG. 2 is a block diagram illustrating a configuration of a glasses apparatus 100 according to an exemplary embodiment, and FIG. 2 is a view illustrating a glasses apparatus 100. The glasses apparatus 100 includes a communicator 110, audio signal processor 120, switch 130, microphone 140, osteophony speaker 150, controller 160 and glasses unit 170.

The communicator 110 performs communication with the external display apparatus 200. The communicator 110 may receive a synchronization signal from the display apparatus 100 so that the glasses apparatus 100 may be synchronized with the contents reproduced in the display apparatus 200.

Specifically, the communicator 110 may receive one of contents audio related to contents images displayed on the display apparatus 200, and call audio from the display apparatus 200. In addition, the communicator 110 may transmit a request signal for changing the audio to the display apparatus 200.

The communicator 110 may be embodied in one of various communication modules such as Bluetooth, Wi-Fi, and Wireless LAN etc. However, the communication modules are not limited thereto.

The audio signal processor 120 performs signal processing on the audio data transmitted from the display apparatus 200. Herein, the audio signal processor 120 may perform signal processing for improving frequency characteristics of the audio received to improve strength characteristics at a narrow frequency bandwidth and low frequency bandwidth which is a disadvantage of an osteophony speaker.

In addition, the audio signal processor 120 may perform signal processing in such a manner to have a different frequency response according to the type of audio received. More specifically, when a call audio is received, the audio signal processor 120 modifies the frequency response characteristics of the call audio so that the user's voice can be heard more clearly, and when contents audio is received, the audio signal processor 120 may modify the frequency response characteristics of the contents audio so that the contents audio may be heard grandly.

Figure 3:
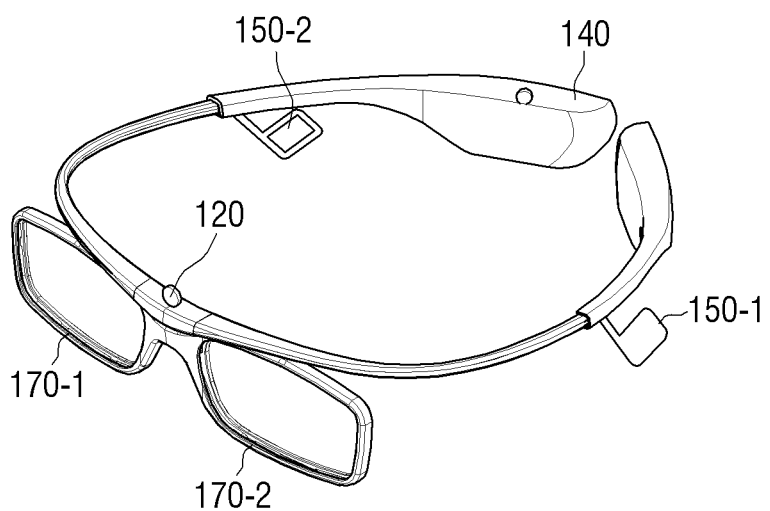
FIG. 3 is a view illustrating a glasses apparatus in accordance with an exemplary embodiment.

The switch 130 is a configuration for generating and transmitting a request signal to change the audio to the display apparatus 200. When the switch 130 is selected while the call audio is being output, the controller 160 may generate a request signal to change the audio which requests transmission of the contents audio, and transmit the generated request signal for audio change to the display apparatus 200. Herein, the switch 130 may be disposed at an end of an arm of the glasses apparatus 100 as illustrated in FIG. 3, but this is just an exemplary embodiment, and thus the switch 130 may be disposed in another area (for example, a middle portion of the arm of the glasses) of the glasses apparatus 100.

The microphone 140 receives a user's voice. The user's voice that the microphone 140 received is transmitted to the display apparatus 200 through the communicator 110. Herein, as illustrated in FIG. 3, the microphone 140 may be disposed between the left eye glass and the right eye glass, but this is just an exemplary embodiment, and thus the microphone may be disposed in another area of the glasses where the user's voice can be input.

The osteophony speaker 150 outputs audio data according to a control by the controller 160. Herein, as illustrated in FIG. 3, the osteophony speaker 150 may be disposed in a protruding area of a middle area of an arm of the glasses so that the osteophony speaker 150 can contact the portion of the user's body beneath the user's ear. In addition, the osteophony speaker 150 may consist of a right side osteophony speaker 150-2 and a left side osteophony speaker 150-1, as illustrated in FIG. 3.

The glasses unit 170 may be synchronized with 3D contents, and may be turned on/off. Specifically, the glasses unit 170 may turn on the left eye glasses unit 170-2 and turn off the right eye glasses unit 170-1 when a left eye image is displayed in the display apparatus 200, and turn on the right eye glasses unit 170-1 and turn off the left eye glasses unit 170-2 when a right eye image is displayed in the display apparatus 200.

The glasses unit 170 may have a liquid material inside the glasses so as to display an image.

The controller 160 may control the overall operations of the glasses apparatus 100. Specifically, in the case where the display apparatus 200 provides a contents image, the controller 160 receives contents audio related to the contents image from the display apparatus 200, and in the case where the display apparatus 200 performs a call function with an external user, the controller 160 may control the communicator 110 to receive call audio from the display apparatus 200. In addition, the controller 160 may control the osteophony speaker 150 to output one of the received contents audio and call audio.

Herein, the controller 160 may determine the type of the audio received, and modify the frequency response characteristics differently according to the type of audio. More specifically, in the case where the type of the received audio is contents audio, the controller 160 may modify the frequency response characteristics so that contents audio can be heard grandly. In the case where the type of the received audio is call audio, the controller 160 may modify the frequency response characteristics so that the call voice can be heard clearly.

In addition, in the case where the user's voice is received through the microphone 140, the controller 160 may control the communicator 110 to transmit the user's voice received through the microphone 140 to the display apparatus 200.

Specifically, in the case where the display apparatus 200 performs a function of providing contents, the controller 160 may control the communicator 110 to transmit the received voice to the display apparatus 200, and may control functions of the display apparatus 200 according to the received voice (for example, a contents reproducing function). For example, when a user's voice "stop" is input through the microphone 140, the controller may transmit the user's voice "stop" to the display apparatus 200, and the display apparatus 200 may stop the reproduction of the contents image according to the received user's voice.

In the case where the display apparatus 200 performs a call function, the controller 160 may control the communicator 110 to transmit the received voice to the display apparatus 200, and the display apparatus 200 may transmit the received voice to the external electronic apparatus corresponding to the call function.

In addition, in the case where the switch 130 is selected while the call audio is being received from the display apparatus 200, the controller 160 may generate an audio change request signal to change the audio transmitted from the display apparatus 200 from the call audio to contents audio. In addition, the controller 160 may transmit the audio change request signal to the display apparatus 200, and may receive contents audio from the display apparatus 200 and output the received contents audio through the osteophony speaker 150. Herein, the display apparatus 200 may stop the outputting of the contents audio and output call audio.

In the aforementioned exemplary embodiment, the glasses apparatus 100 performs signal processing to improve the frequency characteristics of the call audio, but this is just an exemplary embodiment, and thus the display apparatus 200 may perform signal processing to improve the frequency characteristics of the call audio, and then transmit the call audio to the glasses apparatus 100.

Figure 4:
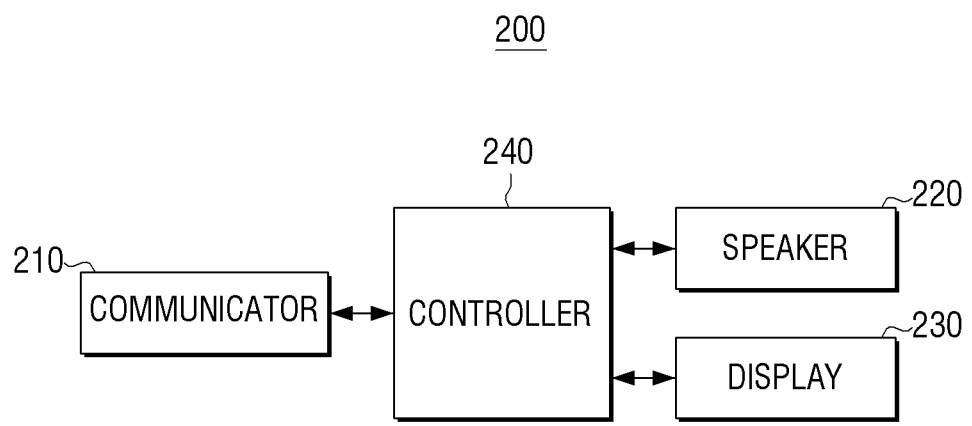
FIG. 4 is a block diagram illustrating a configuration of a display apparatus in accordance with an exemplary embodiment.

FIG. 4 is a block diagram illustrating a configuration of the display apparatus 200 according to an exemplary embodiment. As illustrated in FIG. 4, the display apparatus 200 includes a communicator 210, a speaker 220, a display 230 and a controller 240.

FIG. 4 is an illustration of a case where the display apparatus 200 has a communicating function, and a contents reproducing function. Therefore, depending on the exemplary embodiment, some of the constituting elements illustrated in FIG. 4 may be omitted or changed, and other elements may be added instead.

The communicator 210 performs communication with the glasses apparatus 100. Specifically, the communicator 210 may transmit contents reproduced in the display apparatus 200 and a synchronization signal for synchronizing the opening/closing timing of the left-eye glass and right-eye glass of the glass apparatus 100 to the display apparatus 200. The communicator 210 may transmit one of contents audio and call audio to the glasses apparatus 100. In addition, the communicator 210 may receive the audio change request signal from the glasses apparatus 200.

In addition, the communicator 210 of the display apparatus may perform communication with an external apparatus in order to perform a call function with an external user.

The communicator 210 may be embodied in one of various communication modules such as Bluetooth, Wi-fi, and wireless LAN. However, the communication modules of the communicator 210 are not limited thereto.

The speaker 220 outputs contents audio or call audio by controlling by the controller 240. Specifically, in the case where the glasses apparatus 100 outputs contents audio, the speaker 220 may output call audio, and in the case where the glasses apparatus outputs call audio, the speaker 220 may output contents audio.

The display 230 displays image data according to control processes performed by the controller 240. Specifically, when a request for executing display a video call function is input by a user while a contents image is being displayed, the display 230 may simultaneously display a video call screen, and the contents image. Herein, the display 230 may display one of an image call screen and contents image on a Picture in Picture (PIP) by a user's selection.

The controller 240 controls the overall functions of the display apparatus 200 according to a user's command. Specifically, in the case of performing a call function (for example, a video call or voice call) with an external user while a contents image is displayed, the controller 240 may transmit call audio to the glasses apparatus 100 through the communicator 210, and output contents audio corresponding to the contents image through the speaker 220.

Specifically, the controller 240 may modify the frequency response characteristics differently according to the type of the audio being transmitted to the glasses apparatus 100 and transmit the modified frequency response characteristics. For example, in the case where the audio transmitted to the glasses apparatus 100 is contents audio, the controller 240 may modify the frequency response characteristics of the contents audio so that the contents audio is reproduced grandly, and transmit the modified frequency response characteristics. Otherwise, in the case where the audio transmitted to the glasses apparatus 100 is call audio, the controller 240 may modify the frequency response characteristics of the call audio so that the user's voice can be heard clearly and transmit the modified frequency response characteristics.

Otherwise, when an audio change request signal is received from the glasses apparatus 100 while the call audio is transmitted to the glasses apparatus 100, the controller 240 may stop transmitting the call audio and transmit the contents audio corresponding to the contents image to the glasses apparatus 100.

Figure 5:
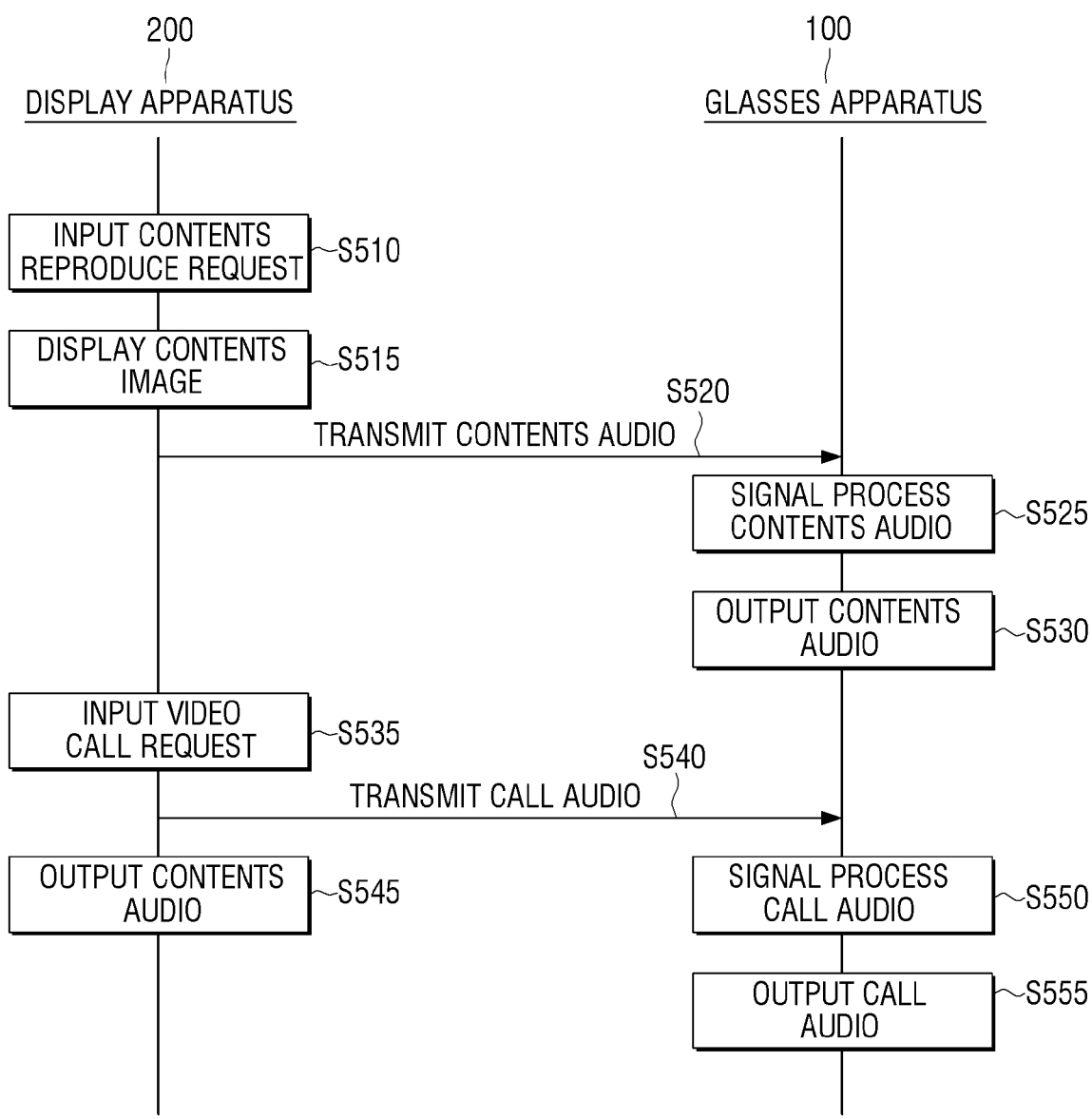
FIG. 5 is a sequence view for explaining an exemplary embodiment where a display system reproduces contents audio and call audio.

FIG. 5 is a sequence view for explaining an exemplary embodiment where contents audio and call audio are reproduced in a display system.

The display apparatus 200 receives an input of a contents reproducing request from a user (S510).

When the contents reproducing request is input, the display apparatus 200 displays a contents image (S515). In addition, the display apparatus 200 transmits contents audio corresponding to the contents image to the glasses apparatus (S520).

When the contents audio is received, the glasses apparatus 100 performs signal processing of the contents audio (S525). Herein, the glasses apparatus 100 may modify the frequency response characteristics of the contents audio so that the contents audio can be reproduced grandly.

In addition, the glasses apparatus 100 outputs the signal processed contents audio (S530). Herein, the glasses apparatus 100 may output contents audio through the osteophony speaker 150.

The display apparatus 200 receives an input of a video call request from the user while displaying the contents image (S535).

When the video call is performed, the display apparatus 200 transmits the call audio to the glasses apparatus 100. Herein, the display apparatus 200 may stop transmission of the existing contents audio. In addition, the display apparatus 200 outputs the contents audio through the speaker in the display apparatus 200 (S545).

When call audio is received, the glasses apparatus 100 performs signal processing of the call audio (S550). Herein, the glasses apparatus 100 may process the signal of the call audio to have different frequency response characteristics from the contents audio. More specifically, the glasses apparatus 100 may modify the frequency response characteristics of the call audio so that the user's voice can be heard clearly.

In addition, the glasses apparatus 100 outputs the signal processed call audio (S555). Herein, the glasses apparatus 100 may output the call audio through the osteophony speaker 150.

As aforementioned, by providing the call audio through the osteophony speaker of the glasses apparatus 100, the user is able to simultaneously view the contents image while making a video call with the call counterpart.

Hereinbelow is an explanation on various exemplary embodiments of the glasses apparatus which has an osteophony speaker with reference to FIGS. 6 to 11.

Figure 6:
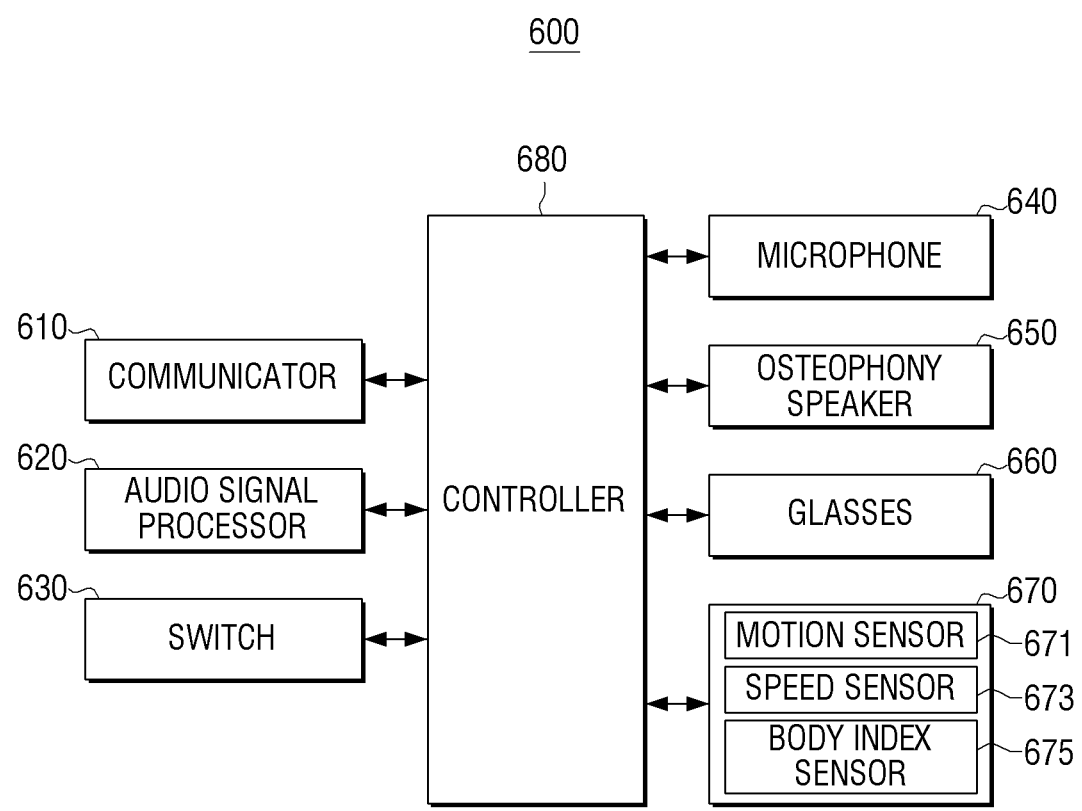
FIG. 6 is a block diagram illustrating a configuration of a glasses apparatus in accordance with an exemplary embodiment.

FIG. 6 is a block diagram illustrating a configuration of a glasses apparatus 600 according to another exemplary embodiment. As illustrated in FIG. 6, the glasses apparatus 600 includes a communicator 610, an audio signal processor 620, a switch 630, a microphone 640, an osteophony speaker 650, a glasses unit 660, sensor 670, and a controller 680.

With regard to the communicator 610, the audio signal processor 620, the switch 630, the microphone 640, the osteophony speaker 650, the glasses unit 660 and the controller 680 illustrated in FIG. 6, explanation overlapping with on the description of the communicator 110, the audio signal processor 120, the switch 130, microphone 140, the osteophony speaker 150, the glasses unit 170 and the controller 160 illustrated in FIG. 6 will be omitted.

The sensor 670 includes a motion sensor 671, a speed sensor 673, and a body index sensor 675. The motion sensor 671 senses a user's motion using various sensors such as an acceleration sensor, a gyro sensor, and a camera etc. The speed sensor 673 senses a speed of an external object moving towards the glasses apparatus 100. The body index sensor 675 senses the user's body index (for example, blood pressure, pulse, body temperature, and brainwave etc.).

The controller 680 may control the communicator 610 to transmit one of the user motion information sensed in the motion sensor 671 and the user's body index information sensed in the body index sensor 675 to the display apparatus 200. In the case where the user motion information is transmitted to the display apparatus 200, the display apparatus 200 may control various functions of the display apparatus according to the user's motion information. For example, in the case where the display apparatus 200 executes a game contents, the display apparatus 200 may control the character of the game contents according to the user's motion information. In the case where the user's body index information is transmitted to the display apparatus, the display apparatus 200 may extract and store a main screen of the contents according to the body index.

In addition, in the case where a speed of an external object sensed by the speed sensor 673 is equal to or greater than a predetermined speed, the controller 680 may output an alarm message through one of the osteophony speaker 650 and glasses unit 660. That is, the controller 680 may output an alarm message by transmitting an audio signal through the osteophony speaker 650, or by displaying an image through the glasses unit 660.

In addition, in the case where the body index sensed by the body index sensor 675 satisfies a predetermined condition, the controller 680 may control the osteophony speaker 650 to generate a low frequency vibration having a predetermined frequency.

In addition, in the case where a contents image is received from an authenticated external apparatus, the controller 680 may control the glasses unit 660 to display the received contents image. For example, in the case where the glasses apparatus is communicating with an authenticated external navigation apparatus, when a moving route image is received from the navigation apparatus, the controller 680 may display the received moving route image on the glasses unit 660.

Figure 7:
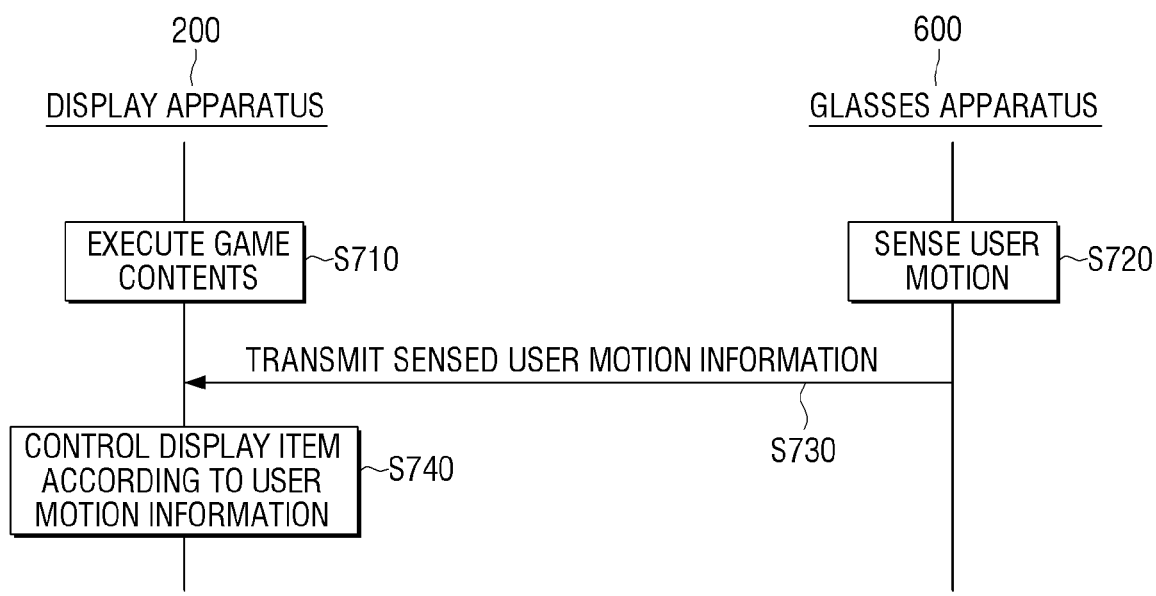
FIG. 7 is a sequence view for explaining a providing method of a display apparatus using a user's motion sensed by a glasses apparatus in accordance with an exemplary embodiment.

FIG. 7 is a sequence view illustrating a method for providing contents of the display apparatus 200 based on a user's motion that the glasses apparatus 600 has sensed.

The display apparatus 200 executes game contents (S710).

The glasses apparatus 600 senses the user's motion information using the motion sensor 671 (S720). Herein, the sensed user's motion information may be one of a direction and speed of the user's motion.

The glasses apparatus 600 transmits the sensed user's motion information to the display apparatus 200 (S730).

The display apparatus 200 controls a display item according to the received user's motion information (S740). For example, in the case where the game contents is a racing game contents, the display apparatus 200 may control the movement of a displayed car based on a user's motion direction information among the received user's motion information. Otherwise, in the case where the game contents is a running game contents, the display apparatus 200 may control the speed of the displayed character based on the user's speed information among the received user's motion information.

Herein, the display apparatus 200 may not only provide the contents audio of the game contents but may also embody sound effects of the low sound vibration of the osteophony speaker of the glasses apparatus 600 at the same time through the speaker 220. In addition, by using the osteophony speaker, it enables communication among gamers even in noisy situation. Thus the osteophony speaker 600 may be useful in group/team games.

Figure 8:
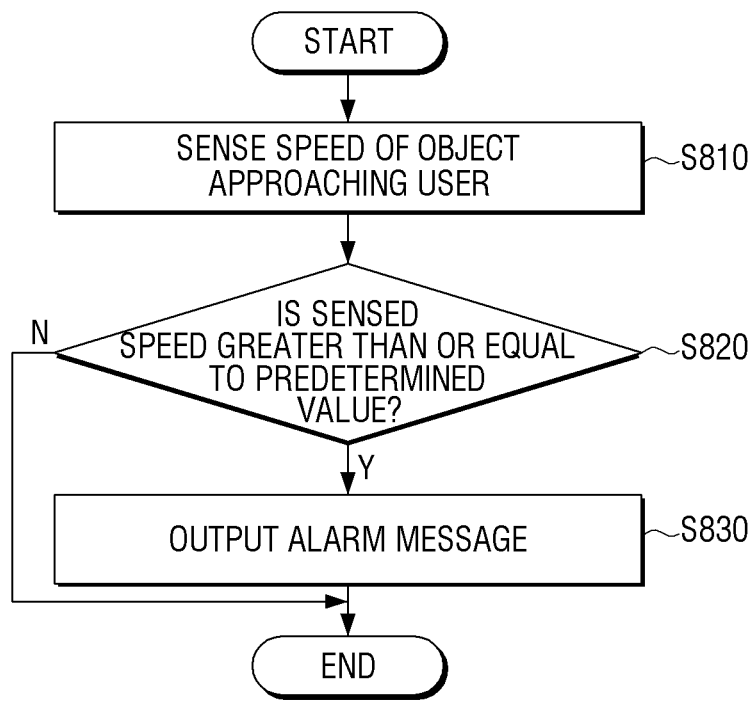
FIG. 8 is a flowchart illustrating a method where a glasses apparatus senses a speed of an object and guidance danger in accordance with an exemplary embodiment.

FIG. 8 is a flowchart illustrating a method where a glasses apparatus senses a speed of an object and emits an alarm message.

The glasses apparatus 600 senses the speed of an object approaching the user using the speed sensor 673 (S810).

In addition, the glasses apparatus 600 determines whether or not the sensed speed is equal to or greater than the predetermined value (S820).

In the case where the sensed speed is equal to or greater than the predetermined value (S820—Y), the glasses apparatus 100 outputs an alarm message (S830). Herein, the alarm message may be provided by audio through the osteophony speaker 650, or by images through the glasses unit 660. For example, the glasses apparatus 100 may output the audio "be careful" through the osteophony speaker 650, or a text which reads "be careful" through the glasses unit 660.

Figure 9:
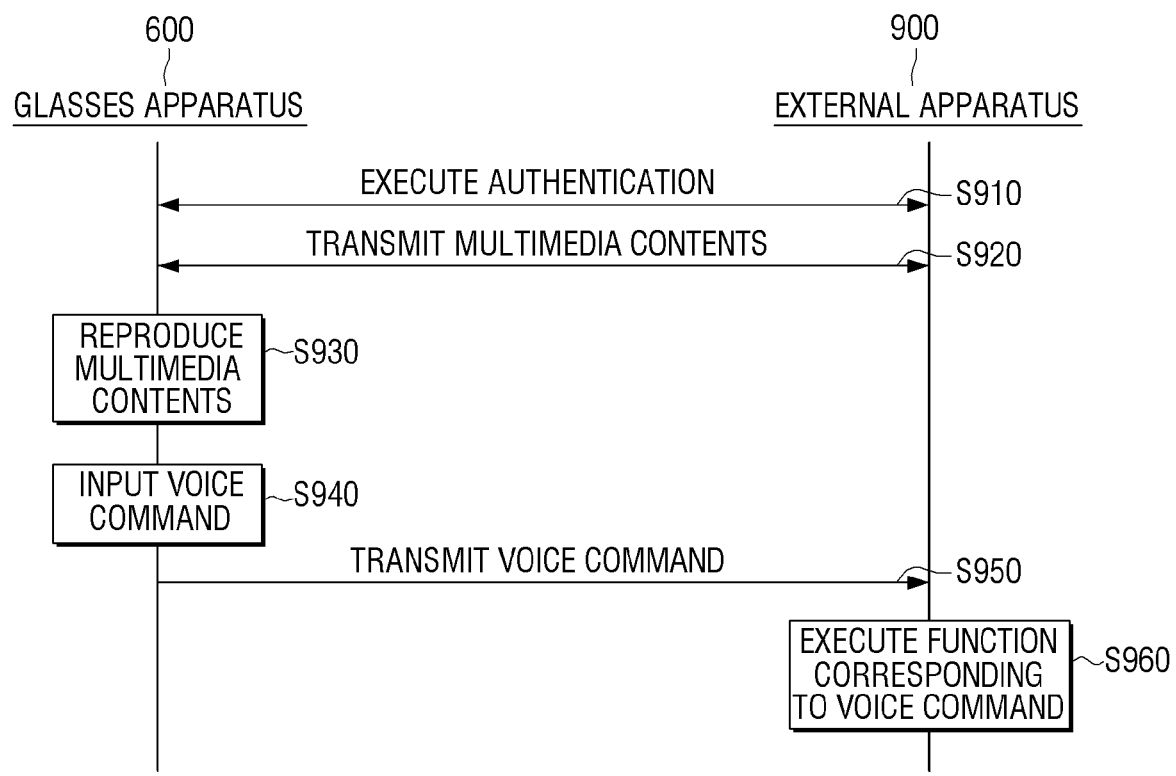
FIG. 9 is a sequence view for explaining a method where a glasses apparatus receives contents reproduced in an external multimedia and reproduces the received contents in accordance with an exemplary embodiment.

FIG. 9 is a sequence view illustrating a method where a glasses apparatus receives contents reproduced in an external multimedia apparatus and reproduces the received contents.

The glasses apparatus 600 and the external apparatus 900 performs an authentication process (S910). Herein, performing authentication may be one of password authentication, voice authentication, fingerprint authentication, face recognition authentication. Herein, the external apparatus 900 may be a navigation apparatus, but this is just an exemplary embodiment, and thus the external apparatus 900 may be embodied in one of various apparatuses such as a smart phone and tablet PC.

When authentication between the glasses apparatus 600 and the external apparatus 900 is performed, the external apparatus 900 transmits multimedia contents (S920). Herein, the transmitted multimedia contents is one that is currently reproduced in the external apparatus 900, including not only audio data but also image data. Specifically, the multimedia contents may be one of video contents, road guiding contents, and music contents, but is not limited thereto.

The glasses apparatus 600 reproduces multimedia contents received from the external apparatus 900 (S930). Herein, the glasses apparatus 600 may output audio data through the osteophony speaker 650, and output image data through the glasses unit 660.

In addition, the glasses apparatus 600 receives an input of a voice command from the user (S940). Herein, the glasses apparatus 600 may receive an input of the voice command through the microphone 640. In addition, the glasses apparatus 600 may transmit the input voice command to the external apparatus 900 (S950).

In addition, the external apparatus 900 executes a function corresponding to the received voice command (S960). For example, the external apparatus 900 may control the reproducing function of the multimedia contents according to the voice command and control other functions of the external apparatus 900.

Specifically, in the case where the external apparatus 900 is a navigation apparatus, the user is able to hear the audio of multimedia contents (for example, road guiding contents) and the sound from external sources at the same time by using the osteophony speaker 650 which does not cover the user's ears.

Figure 10:
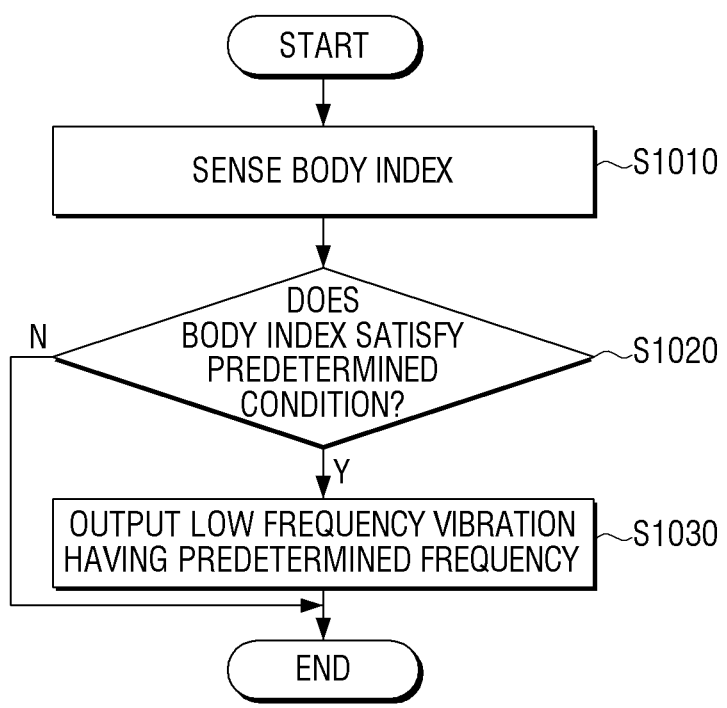
FIG. 10 is a flowchart for explaining a method where a glasses apparatus senses a user's body index and provides a low frequency signal.

FIG. 10 is a flowchart illustrating a method where the glasses apparatus senses a user's body index and provides a low frequency signal.

The glasses apparatus 600 senses the user's body index using the body index sensor 675 (S1010). More specifically, the glasses apparatus 600 may sense pulse information, brainwave information, body temperature information etc. using a body index sensor 675 such as a pulse measurer, brainwave measurer, and body temperature measurer, and may sense blood pressure information and weight information etc. using another type of body index sensor 675 such as a blood pressure measurer and weight measurer etc. connected to the glasses apparatus 600 wirelessly or in a wired manner.

The glasses apparatus 600 determines whether or not the body index satisfied a predetermined condition (S1020). Herein, the predetermined condition refers to a condition where the user's health may be in trouble, for example when the blood pressure is above a predetermined value, for example, 140 mmHg, or when the minimum blood pressure is below a predetermined value, for example 90 mmHg.

When the body index satisfies the predetermined condition (S1020—Y), the glasses apparatus outputs a low frequency vibration having a predetermined frequency using the osteophony speaker 650 (S1030). More specifically, the osteophony speaker 650 outputs a vibration having the predetermined frequency, and the glasses apparatus 600 may control the osteophony speaker 650 to generate a low frequency vibration having a predetermined frequency. In addition, the glasses apparatus 600 may output a therapy image or sound together.

Figure 11:
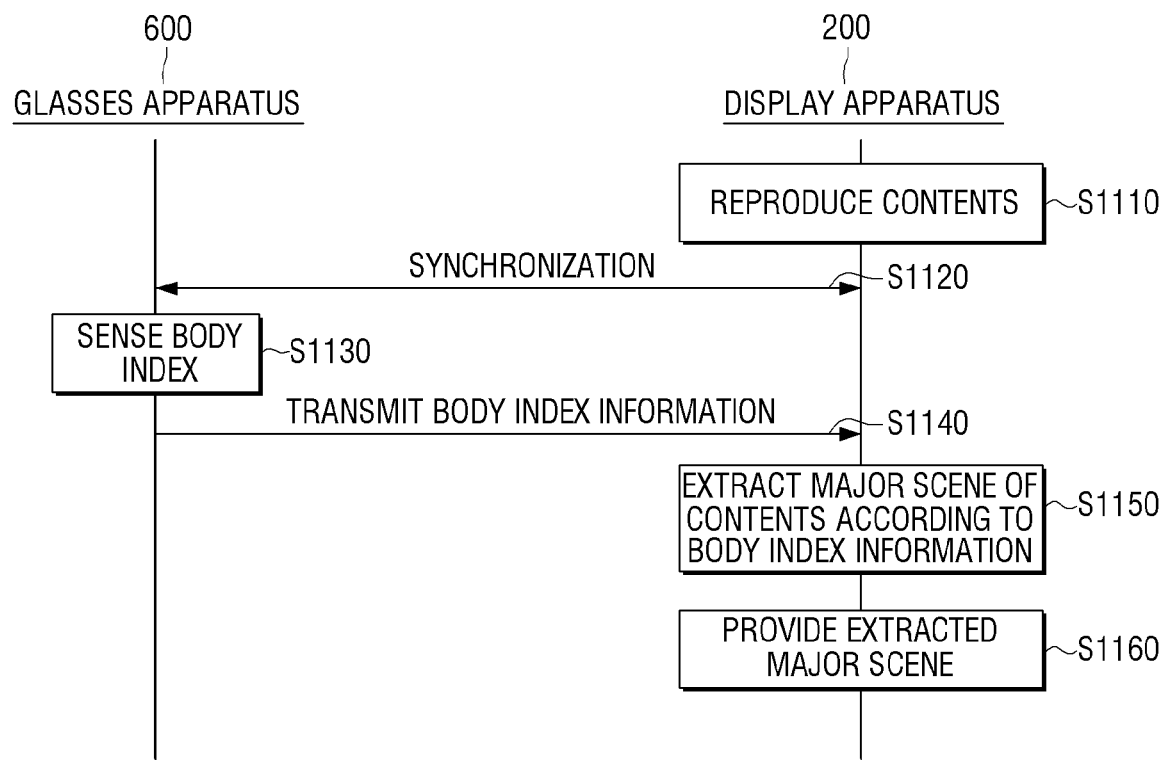
FIG. 11 is a flowchart for explaining a method of extracting a main screen of contents and providing the same according to a user's body index in accordance with an exemplary embodiment.

FIG. 11 is a flowchart illustrating a method of extracting a main screen and providing the extracted main screen according to the user's body index.

The display apparatus 200 reproduces contents (S1110). Herein, the reproduced contents may be one of video contents, music contents, and photo contents, but is not limited thereto.

In addition, the display apparatus 200 performs synchronization with the glasses apparatus 600 (S1120). Herein, the display apparatus 200 may time-synchronize the contents being reproduced and the body index information to be received in the glasses apparatus 600 (S1120).

In addition, the glasses apparatus 600 senses the user's body index using the body index sensor 670 (S1130). For example, the glasses apparatus 600 may sense the blood pressure, pulse, body temperature, and brainwave etc. through the body index sensor 670 (S1120).

In addition, the glasses apparatus 600 transmits the sensed body index information to the display apparatus 200 (S1140).

The display apparatus 200 extracts the main screen of the contents according to the body index information (S1150). More specifically, when the user views a moving screen or an image on the screen that corresponds to a shocking event, the body index changes. For example, when viewing a shocking event on the screen, the pulse rate quickens. If a more serene image is displayed on the screen, the pulse rate may slow down. In addition, when a shocking image is being displayed, a first brainwave of a predetermined format may be recorded, and when a more serene image is displayed on the screen, a second brainwave different from the first brainwave may be recorded. Therefore, when a body index which satisfies the predetermined condition is sensed, the display apparatus 200 extracts the screen reproduced at a point where the body index which satisfies the predetermined condition is reproduced. Herein, the display apparatus 200 may store the body index information in the metadata of the contents as tagging information in order to extract the main screen, and may generate an image where the main screen is automatically extracted using the body index information. Herein, the display apparatus 200 provides the extracted main screen (S1160). More specifically, when a predetermined command is input from the user, the display apparatus 200 may display the main screen or transmit the predetermined command as a Social Network Service (SNS) to an external user.

Hereinbelow is explanation on an audio apparatus and a method of providing an audio signal thereof with reference to FIGS. 12 to 15

Figure 12:
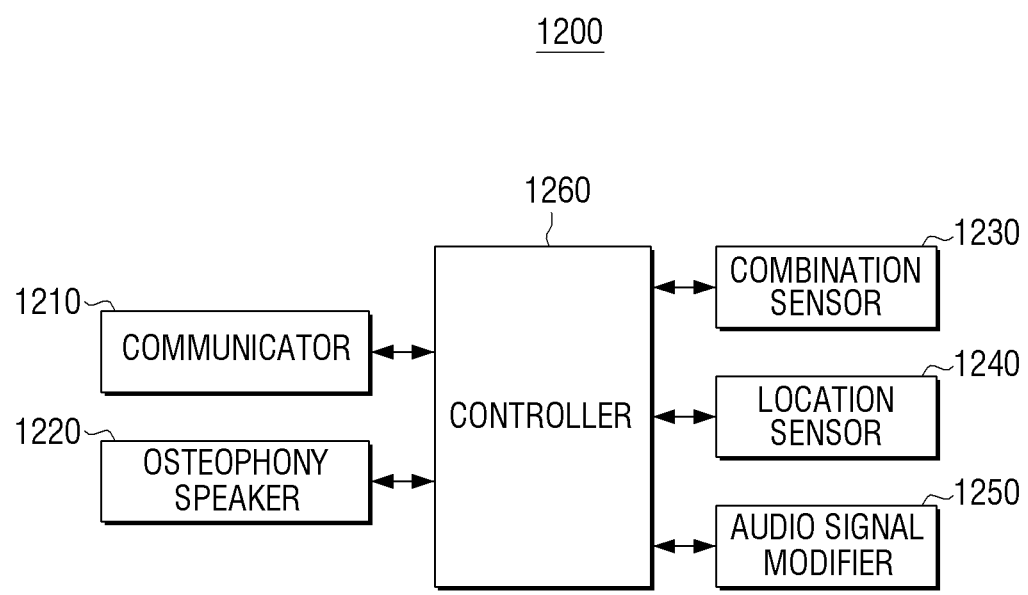
FIG. 12 is a schematic view of a configuration of an audio apparatus in accordance with an exemplary embodiment.

FIG. 12 is a block diagram briefly illustrating a configuration of the audio apparatus 1200 according to an exemplary embodiment. As illustrated in FIG. 12, the audio apparatus 1200 includes a communicator 1210, an osteophony speaker 1220, a combination sensor 1230, a location sensor 1240, an audio signal modifier 1250, and a controller 1260. Herein, the audio apparatus 1200 may be embodied as an earphone which includes an osteophony speaker. However, this is just an exemplary embodiment, and the audio apparatus may be embodied as any other audio apparatus (for example, headphone).

The communicator 1210 performs communication with various external apparatuses. Especially, the communicator 1210 may receive a first audio signal from an external audio source providing apparatus (for example, MP3 player, smartphone etc.). In addition, when the audio apparatus is combined with the glasses apparatus, the communicator 1210 may operate in an interlocked manner with the glasses apparatus and receive a second audio signal from the display apparatus.

The communicator 1210 may be embodied as a Bluetooth module, but this is just an exemplary embodiment, and thus the communicator 1210 may be embodied as one of other wired communication module and wireless communication module.

The combination sensor 1230 may sense whether the audio apparatus 1200 is attached to the glasses apparatus 100. More specifically, when an area of the audio apparatus 1200 contacts the glasses apparatus or the jack of the audio apparatus 1200 is connected to the glasses apparatus, the combination sensor 1230 may sense the combination of the audio apparatus 1200 and glasses apparatus, or may sense that the audio apparatus 1200 is attached to the glasses apparatus 100.

The location sensor 1240 senses a location of the osteophony speaker 1220. More specifically, the location sensor 1240 may sense the body part of the person that the osteophony speaker 1220 is in contact with, and determine the location of the osteophony speaker 1220. Otherwise, when the audio apparatus 1200 is a kernel type earphone, the location sensor 1240 may determine the bent angle of the audio apparatus 1200 and sense the location of the osteophony speaker 1220.

The audio signal modifier 1250 modifies the audio signal received by the control of the controller 1260. Especially, the audio signal modifier 1250 may modify the audio signal differently according to the location of the osteophony speaker 1220. This will be explained in more detail hereinbelow with reference to FIGS. 13A and 13B.

The controller 1260 controls the overall functions of the audio apparatus 1200. Specifically, when it is sensed by the combination sensor 1230 that the audio apparatus 1200 is combined with the glasses apparatus while the first audio signal is being received from the audio source providing apparatus, the controller 1260 may stop receiving the first audio signal from the audio source providing apparatus, control the communicator 1210 to receive the second audio signal from the display apparatus which operates in an interlocked manner with the glasses apparatus, and control the osteophony speaker 1220 to output the second audio signal.

More specifically, the controller 1260 may receive the first audio signal through the communicator 1210 from the audio source providing apparatus.

When it is sensed by the combination sensor 1230 that the audio apparatus 1200 is combined with the glasses apparatus (for example, 3D shutter glasses etc.) while receiving the first audio signal, the controller 1260 may stop the output of the first audio signal. In addition, the controller 1260 performs communication with the display apparatus based on communication information (for example, a MAC address) on the display apparatus (for example, a 3D display apparatus). The display apparatus operates in an interlocked manner with the glasses apparatus.

In addition, in the case where a connection process is with the display apparatus, the controller 1260 may control the communicator 1210 to request the display apparatus for the second audio signal.

When the second audio signal is received from the display apparatus in response to the second audio signal request, the controller 1260 may control the osteophony speaker 1220 to output the second audio signal being received. Herein, the second audio signal may be an audio signal synchronized with a 3D image output in the 3D display apparatus.

Figure 16A:
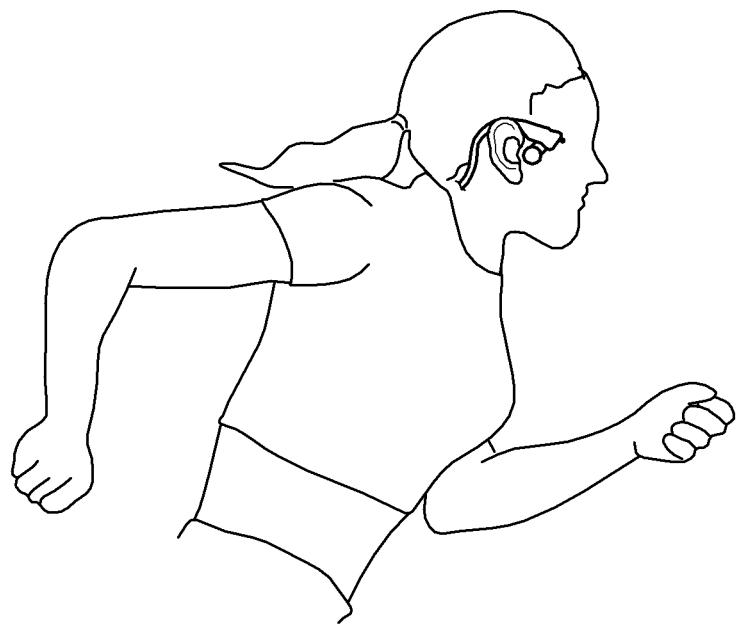
FIG. 16A and FIG. 16B are views illustrating an exemplary embodiment for attaching an audio apparatus to a glasses apparatus in accordance with an exemplary embodiment.
Figure 16B:
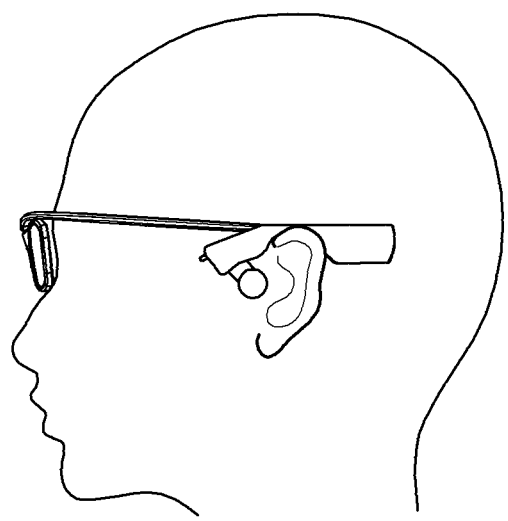

By the aforementioned disclosure, the user is be provided with an audio signal synchronized with the 3D image displayed in the 3D display apparatus which operates in an interlocked manner with the 3D shutter glasses without additional operation, as the user listens to music using the audio apparatus including the osteophony speaker as illustrated in FIG. 16A, and installs the audio apparatus in the 3D shutter glasses.

In addition, the controller 1260 may control the audio signal modifier 1250 to modify the audio signal since the frequency characteristics of the osteophony speaker may need to be modified according to the differences in location of the osteophony speaker sensed by the location sensor 1240.

More specifically, in the case where the location of the osteophony speaker 1220 sensed by the location sensor 1240 is inside the ear as illustrated in the left side of FIG. 13A, the controller 1260 may control the audio signal modifier 1250 to modify the audio signal to a first modification audio signal as illustrated in the right side of FIG. 13A. That is, in order to provide a more immersed and grand sound quality than when viewing a 3D video or orchestral sound, the controller 1260 may control the audio signal modifier 1250 to modify the audio signal being received as illustrated in the right side of FIG. 13A.

Figure 13B:
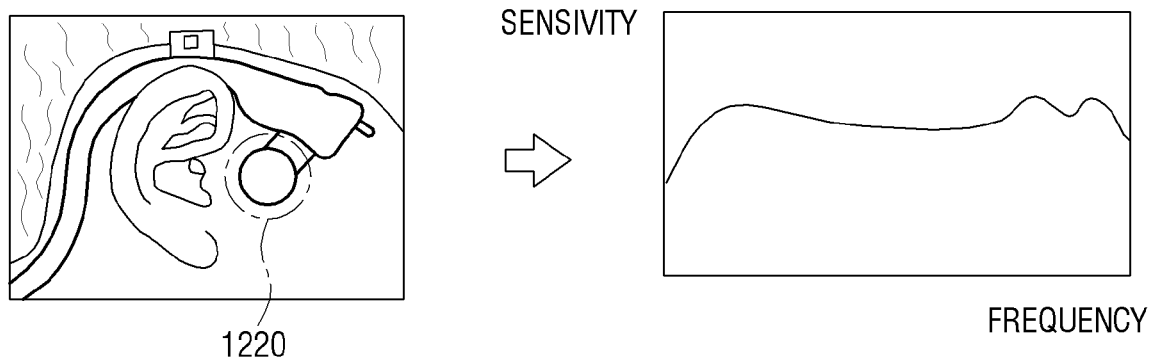

However, as illustrated in the left side of FIG. 13B, in the case where the location of the osteophony speaker 1220 sensed by the location sensor 1240 is outside the ear (for example, the temple), the controller 1260 may control the audio signal modifier 1250 to modify the second modification audio signal as illustrated in the right side of FIG. 13B. That is, in order to be provided with a clear user's voice when making a call or with a normal sound quality, the controller 1260 may control the audio signal modifier 1250 to modify the audio signal being received as illustrated in the right side of FIG. 13A.

As aforementioned, the user may be provided with audio signals of optimized sound quality according various situations by providing audio signals of different sound quality according to the location of the osteophony speaker 1220.

Figure 14:
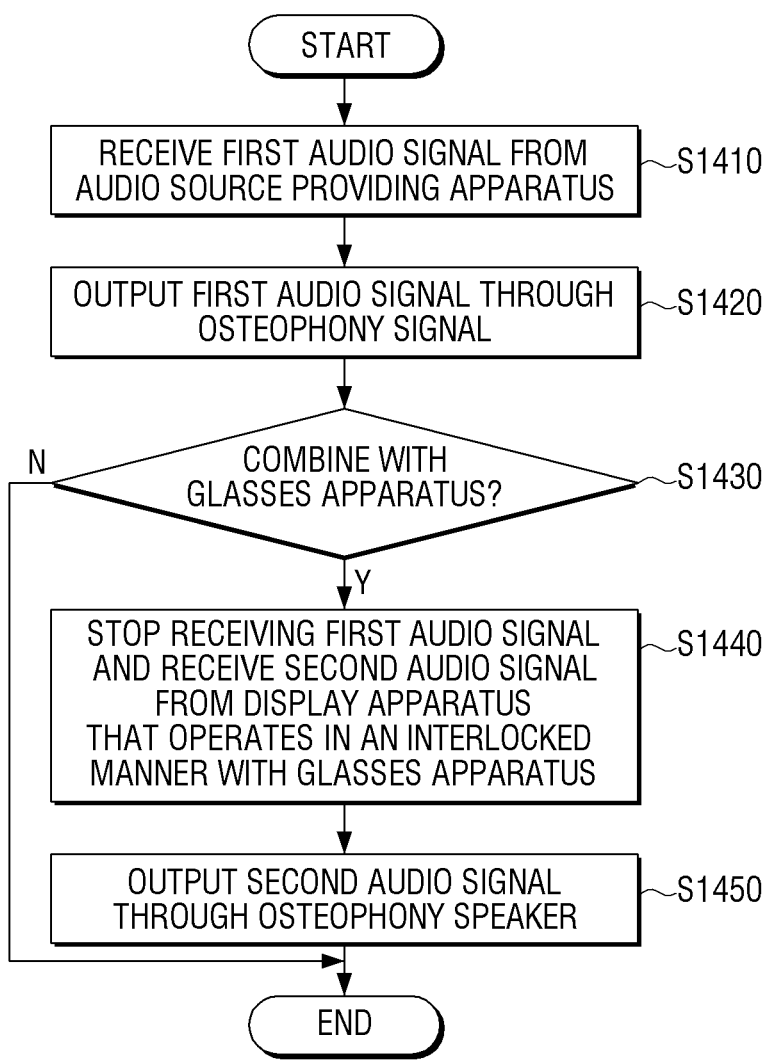
FIG. 14 is a flowchart illustrating a method of providing an audio signal of an audio apparatus in accordance with an exemplary embodiment.

Hereinbelow is an explanation on a method of providing an audio signal of an audio apparatus with reference to FIG. 14.

The audio apparatus 1220 receives a first audio signal from the audio source providing apparatus (S1410). Herein, the first audio signal may be music contents or a call voice.

In addition, the audio apparatus 1200 outputs the first audio signal through the osteophony speaker (S1420).

The audio apparatus 1200 determines whether or not it is combined with, or connected to, the glasses apparatus while outputting the first audio signal (S1430). Herein, the glasses apparatus 1200 may be 3D shutter glasses.

When it is determined that the audio apparatus 1200 is combined with the glasses apparatus (S1430—Y), the audio apparatus 1200 stops receiving the first audio signal and receives the second audio signal from the display apparatus which operates in an interlocked manner with the glasses apparatus (S1440). Herein, the display apparatus may be a 3D display apparatus which operates in an interlocked manner with the 3D shutter glasses, and the second audio signal may be an audio signal which is synchronized with the image displayed in the 3D display apparatus.

In addition, the audio apparatus 1200 outputs the second audio signal through the osteophony speaker (S1450).

As aforementioned, when the audio apparatus is combined with the glasses apparatus, as the audio apparatus receives the audio signal from the display apparatus which operates in an interlocked manner with the glasses apparatus, the audio synchronized with the image output in the display apparatus may be heard, even if the user does not perform an additional operation.

Figure 15:
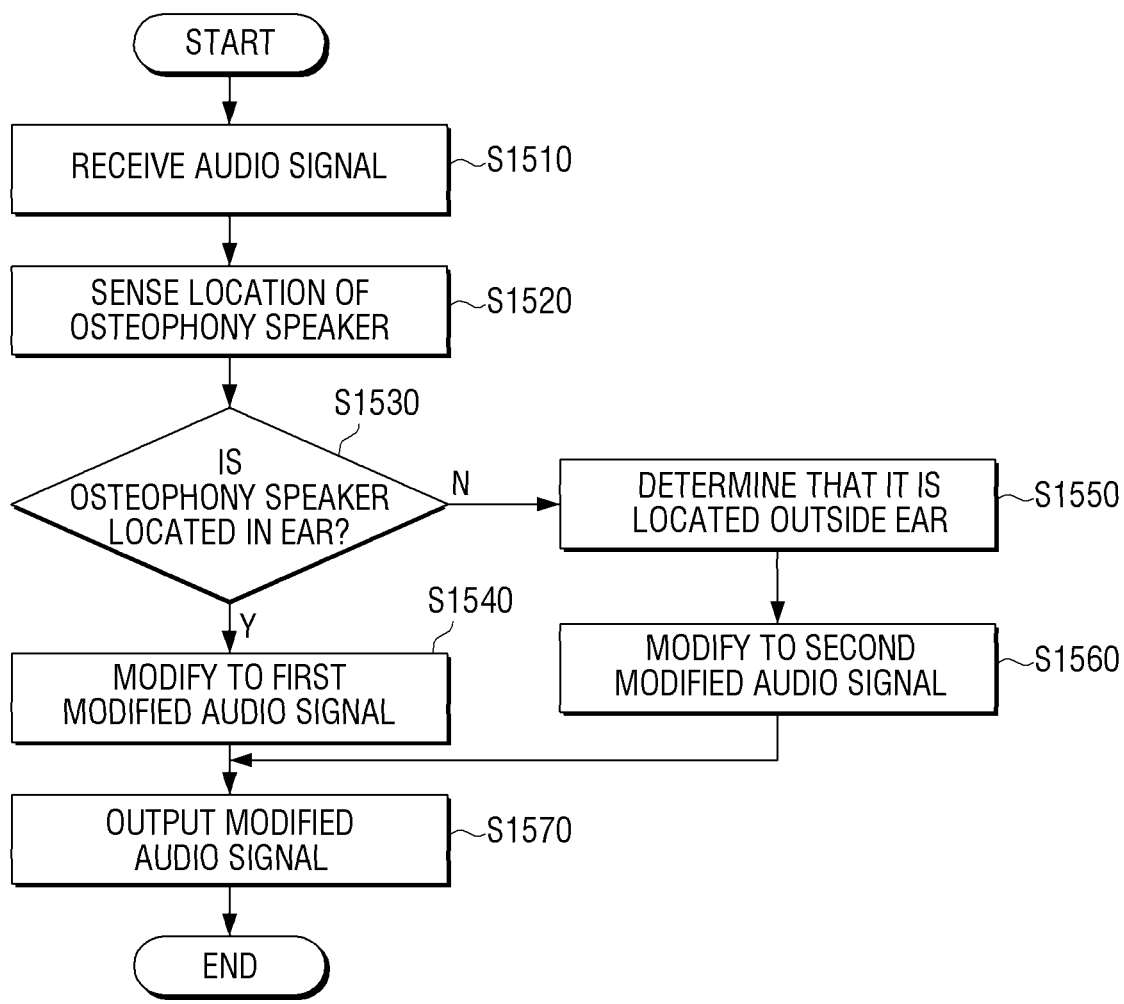
FIG. 15 is a flowchart illustrating a method of modifying an audio signal of an audio apparatus in accordance with an exemplary embodiment.

Hereinbelow is explanation on a method of modifying an audio signal of an audio apparatus 1200 with reference to FIG. 15.

The audio apparatus 1200 receives an audio signal from an external source (S1510). Herein, the audio apparatus 1200 may receive the audio signal from the audio source providing apparatus or the display apparatus.

In addition, the audio apparatus 1200 senses the location of the osteophony speaker (S1520). More specifically, the audio apparatus 1200 may sense whether or not the osteophony speaker is located inside the ear, or outside the ear (S1530).

When the osteophony speaker is located in the ear (S1530—Y), the audio apparatus 1200 modifies the audio signal being received to a first modified audio signal (S1540). Herein, the audio apparatus 1200 may modify the audio signal to an audio signal having an immersed and grand sound quality.

When it is determined that the osteophony speaker is located outside the ear and not in the ear (S1530—N), the audio apparatus 1200 modifies the audio signal to a second modified audio signal (S1560). Herein, the audio apparatus 1200 may modify the audio signal to an audio signal having a clear sound quality.

In addition, the audio signal 1200 outputs the modified audio signal through the osteophony speaker (S1570).

As aforementioned, by providing an audio signal having a different sound qualities according to the location of the osteophony speaker, the user is provided with an audio signal which has an optimized sound quality according to varying situations.

Hereinafter, an audio apparatus according to another exemplary embodiment will be described with reference to FIG. 17 to FIG. 20b.

Figure 17:
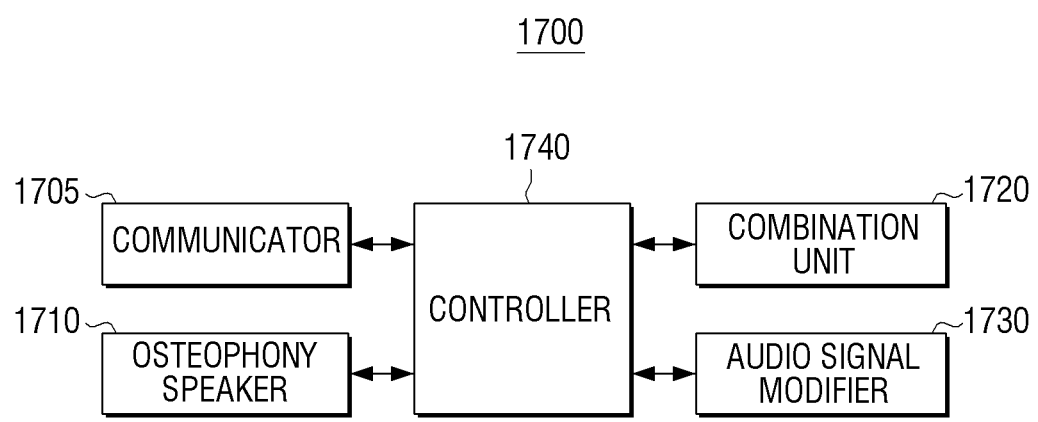
FIG. 17 is a block diagram illustrating a configuration of an audio apparatus briefly according to another exemplary embodiment.

First of all, FIG. 17 is a block diagram illustrating a configuration of an audio apparatus 1700 according to an exemplary embodiment. As illustrated in FIG. 17, the audio apparatus 1700 includes a communicator 1705, an osteophony speaker 1710, a combination unit 1720, an audio signal modifier 1730, and a controller 1740. In this case, the audio apparatus 1700 may be an earphone which includes an osteophony speaker, but this is only an example. The audio apparatus 1700 may be realized as another audio apparatus (for example, a headphone, etc.).

The communicator 1705 performs communication with various external apparatuses. In particular, the communicator 1705 may receive an audio signal from an external audio source providing apparatus (for example, an MP3 player, a smart phone, etc.). The communicator 1705 may be realized as a Bluetooth module, but this is only an example. The communicator 1705 may be realized as other wireless communication modules or wired communication modules.

Figure 18A:
FIGS. 18A and 18B are views illustrating a type of an osteophony speaker according to another exemplary embodiment.
Figure 18B:
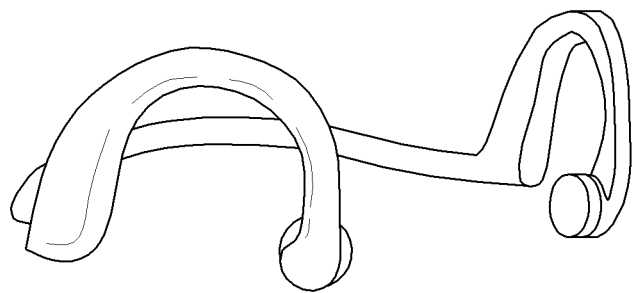

The osteophony speaker 1710 outputs audio data under the control of the controller 1740. In this case, the osteophony speaker 1710 is a speaker which may vibrate a vibrator module contacting a portion of a user's body (for example, beneath the ear) to vibrate the bone adjacent to the ear so that the user may hear a sound, as described above. Herein, the osteophony speaker 1710 may be realized as a headphone as illustrated in FIG. 18A, or as a neck band as illustrated in FIG. 18B. However, this is only exemplary.

Figure 19A:
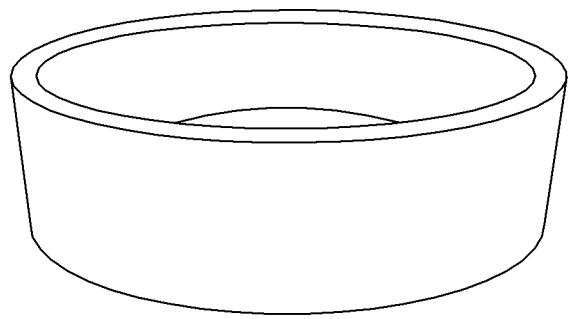
FIGS. 19A and 19B are views illustrating an external part and an internal part of a hair band according to another exemplary embodiment.
Figure 19B:
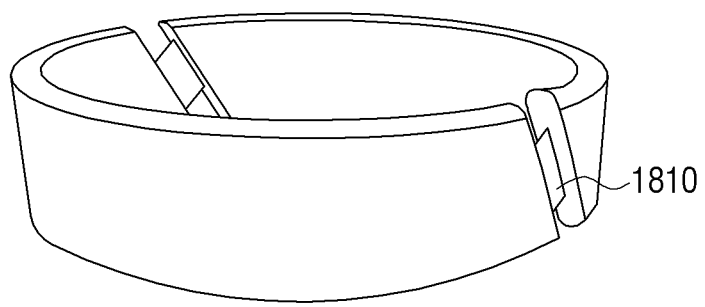

The combination unit 1720 may combine the audio apparatus 1700 with a hair band. In this case, the hair band may be in the form of a circle so that a user can wear it on the head as illustrated in FIG. 19A. In addition, the osteophony speaker 1810 may be included inside the hair band as illustrated in FIG. 19B.

The audio signal modifier 1730 modifies a received audio signal under the control of the controller 1740. In particular, the audio signal modifier 1730 may modify an audio signal differently according to whether a hair band is combined with the audio apparatus, which will be described later with reference to FIG. 20A and FIG. 20B.

The controller 1740 controls overall functions of the audio apparatus 1700. In particular, if it is detected that the audio apparatus 1700 is combined with a hair band through the combination unit 1720, as illustrated in the left side of FIG. 20A, while receiving an audio signal from an audio source providing apparatus, the controller 1740 may control to output the received signal through the osteophony speaker 1810 (FIG. 19B) which is included in the hair band. In particular, if it is detected by the combination unit 1720 that the audio apparatus 1700 is combined with a hair band, the controller 1740 may control the audio signal modifier 1730 to modify the audio signal to a first modified audio signal as illustrated in the right side of FIG. 20A, and may control to output the first modified audio signal through the osteophony speaker 1810 of the hair band. That is, in order to allow a user to listen to a music content while exercising, the controller 1740 may control the audio signal modifier 1730 to increase the sensitivity of the low frequency and the high frequency of the received audio signal as illustrated in the right side of FIG. 20a.

Figure 20A:
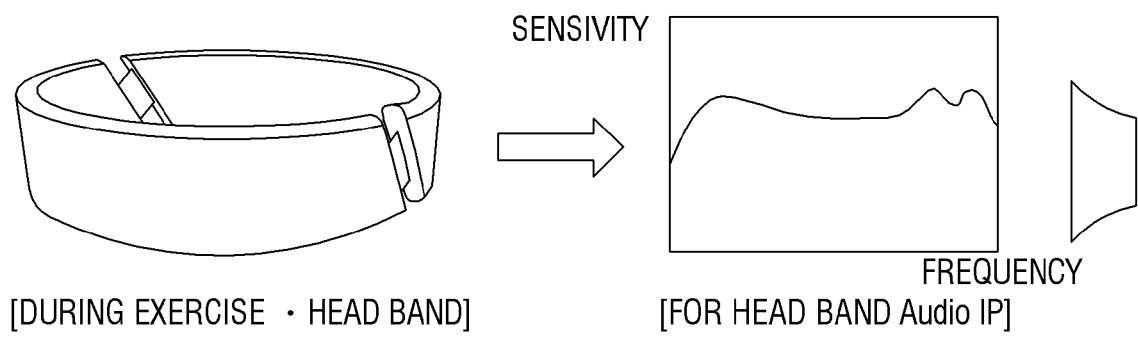
FIGS. 20A and 20B are graphs illustrating an audio signal which is modified according to whether it is combined with a hair band according to another exemplary embodiment.
Figure 20B:
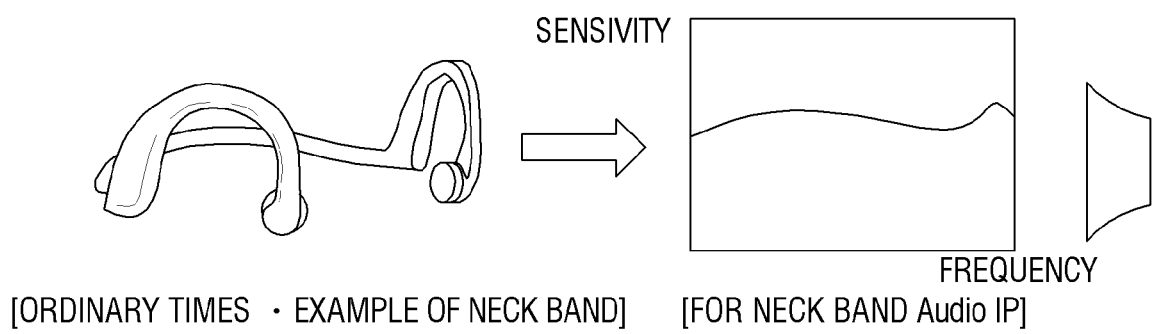

However, if it is detected that the audio apparatus 1700 is not combined with a hair band as illustrated in the left side of FIG. 20B, the controller 1740 may control the audio signal modifier 1730 to modify the audio signal to a second modified audio signal as illustrated in the right side of FIG. 20B, and may control the osteophony speaker 1710 to output the second modified audio signal. That is, in order to allow a user to listen to a music content and an audio content in general circumstances, the controller 1740 may control the audio signal modifier 1250 to even the overall frequency sensitivity of the received audio signal as illustrated in the right side of FIG. 20B.

As described above, by providing an audio signal with different sound quality depending on whether a hair band is combined with the audio apparatus, a user may be provided with an audio signal with optimum sound quality according to varying circumstances through an osteophony speaker.

In the above exemplary embodiment, if the audio apparatus 1700 is combined with a hair band, an audio is output through the osteophony speaker 1810 inside the hair band, but this is only an example. If the osteophony speaker 1720 of the audio apparatus 1700 is mounted on a hair band, an audio may be output through the osteophony speaker 1720 of the audio apparatus 1700.

The method of controlling the glasses apparatus according to the aforementioned various exemplary embodiments may be embodied in a program and may be provided in the glasses apparatus. Especially, a program including the method of controlling the glasses apparatus may be stored in a non-transitory computer readable medium and may be provided.

A non-transitory computer readable medium is a medium which stores data semi-permanently and not a medium which stores data for a short period of time such as a register, cache, and memory etc. More specifically, various aforementioned applications or programs may be stored in a non-transitory computer readable medium such as a CD, DVD, hard disk, Blueray disk, USB, memory card, and ROM etc. and be provided.

According to the various exemplary embodiments discussed above, a user is able to perform an video call with an external user while viewing contents output from a display apparatus. In addition, the user may be provided with various services using an osteophony speaker.

Although a few exemplary embodiments have been shown and described, it would be appreciated by those skilled in the art that changes may be made in the embodiments without departing from the principles and spirit of the inventive concept, the scope of which is defined in the claims and their equivalents.

What is claimed is:

1. A glasses apparatus configured to operate with a display apparatus, the glasses apparatus comprising:
   a communicator configured to communicate with the display apparatus;
   an osteophony speaker configured to output audio received from the display apparatus; and
   a controller configured to control the communicator to receive call audio from the display apparatus, and to output the received call audio to the osteophony speaker when the display apparatus receives call audio from an external user while the display apparatus outputs a contents image,
   wherein the display apparatus outputs a contents audio corresponding to the contents image through a speaker while the glasses apparatus outputs the received call audio through the osteophony speaker.

2. The glasses apparatus according to claim 1, further comprising:
   a microphone configured to receive a user's voice for controlling the display apparatus;
   wherein the controller is configured to control the communicator to transmit the received user's voice to the display apparatus.

3. The glasses apparatus according to claim 1, further comprising:
   a switch configured to select audio to be output from the osteophony speaker,
   wherein the controller is configured to control the communicator to transmit a signal requesting the display apparatus to transmit the contents audio, if the switch is selected while the glasses apparatus is receiving the call audio from the display apparatus.

4. The glasses apparatus according to claim 1, further comprising:
   an audio signal processor configured to perform signal processing to improve frequency characteristics of the received audio;

wherein the controller is configured to control the audio signal processor to determine a type of the audio received through the communicator and to modify frequency characteristics differently according to the received audio type.

5. The glasses apparatus according to claim 1, further comprising:
a motion sensor configured to sense a user's motion,
wherein the controller is configured to control the communicator to transmit information regarding the sensed user's motion to the display apparatus.

6. The glasses apparatus according to claim 1, further comprising:
a speed sensor configured to sense an object's speed;
wherein the controller is configured to output an alarm message through the osteophony speaker if the speed of the sensed object is equal to or greater than predetermined value.

7. The glasses apparatus according to claim 1, further comprising:
a glasses unit configured to display an image;
wherein the controller is configured to control the communicator to receive contents being reproduced in an authenticated external apparatus if the external apparatus is authenticated through the communicator, and to control the glasses unit and osteophony speaker to output the received contents.

8. The glasses apparatus according to claim 1, further comprising:
a body index sensor configured to sense at least one of a brainwave, a body temperature, and a blood pressure of a user;
wherein the controller is configured to control the osteophony speaker to output a low frequency vibration which has a predetermined frequency if one of the sensed brainwave, the sensed body temperature, and the sensed blood pressure satisfies a predetermined condition.

9. The glasses apparatus according to claim 8,
wherein the controller is configured to control the communicator to be time-synchronized with contents being reproduced in the display apparatus, and to transmit information on the at least one of the sensed brainwave, the sensed body temperature, and the sensed blood pressure to the display apparatus while the contents is reproduced.

10. The glasses apparatus according to claim 1, wherein the glasses apparatus is shutter glasses for viewing a three-dimensional (3D) image.

11. A method of controlling a glasses apparatus configured to operate with a display apparatus, the method comprising:
receiving contents audio from the display apparatus if the display apparatus outputs a contents image, and
receiving call audio from the display apparatus, and outputting the received call audio to an osteophony speaker when the display apparatus receives call audio from an external user while the display apparatus outputs a contents image,
wherein the display apparatus outputs a contents audio corresponding to the contents image through a speaker while the glasses apparatus outputs the received call audio through the osteophony speaker.

12. The method according to claim 11, further comprising:
receiving a user's voice for controlling the display apparatus through a microphone; and
transmitting the received user's voice to the display apparatus.

13. The method according to claim 11, further comprising:
transmitting a signal requesting the display apparatus to transmit contents audio if a user's predetermined command is input while receiving the call audio from the display apparatus.

14. The method according to claim 11, further comprising:
determining whether the call audio or the contents audio is received; and
modifying frequency response characteristics differently according to a result of the determining.

15. The method according to claim 11, further comprising:
sensing a user's motion; and
transmitting the sensed user's motion to the display apparatus.

16. The method according to claim 11, further comprising:
sensing an object's speed; and
outputting an alarm message through the osteophony speaker if a speed of the sensed object is equal to or greater than a predetermined value.

17. The method according to claim 11, further comprising:
performing an authentication process with an external apparatus;
receiving contents being reproduced in the authenticated external apparatus if the external apparatus is authenticated; and
outputting the received contents in a glasses unit and the osteophony speaker.

18. The method according to claim 11, further comprising:
sensing at least one of a brainwave, a body temperature, a pulse and a blood pressure of a user; and
outputting a low frequency vibration having a predetermined frequency through the osteophony speaker if the at least one of the sensed brainwave, the sensed body temperature, the sensed pulse and the sensed blood pressure satisfies a predetermined condition.

19. The method according to claim 18, further comprising:
time-synchronizing at least one of the sensed body temperature, the sensed pulse and the sensed blood pressure with contents being reproduced in the display apparatus, and transmitting information on the at least one of the sensed brainwave, the sensed body temperature, the sensed pulse and the sensed blood pressure to the display apparatus while the contents is reproduced.

20. The method according to claim 11,
wherein the glasses apparatus is shutter glasses for viewing a three-dimensional (3D) image.

21. A display apparatus configured to operate with a glasses apparatus, the display apparatus comprising:
a display configured to display an image;
a speaker configured to output audio;
a communicator configured to perform communication with the glasses apparatus; and
a controller configured to transmit call audio to the glasses apparatus through the communicator when performing a call function with an external user while a contents image is displayed on the display, and to output contents audio corresponding to a contents image through the speaker.

22. An audio apparatus comprising:
a communicator configured to receive a first audio signal from an audio source providing apparatus;
an osteophony speaker configured to output the first audio signal;
a combination sensor configured to determine whether the audio apparatus is connected to a glasses apparatus; and
a controller configured to control the communicator to stop receiving the first audio signal from the audio source providing apparatus, to receive a second audio signal from a display apparatus configured to operate in an interlocked manner with the glasses apparatus, if the audio apparatus is determined to be connected to the glasses apparatus, and to output the second audio signal to the osteophony speaker when the display apparatus receives call audio from an external user while the display apparatus outputs a contents image, wherein the display apparatus outputs contents audio corresponding to the contents image through a speaker while the audio apparatus outputs the received call audio through the osteophony speaker.

23. The audio apparatus according to claim 22, wherein the second audio signal being received from the display apparatus is an audio signal synchronized with an image being displayed in the display apparatus.

24. The audio apparatus according to claim 22, further comprising:

a location sensor configured to sense a location of the osteophony speaker; and an audio signal modifier configured to modify at least one of the first audio signal and the second audio signal;

wherein the controller is configured to control the audio signal modifier to modify the at least one of the first audio signal and the second audio signal according to the sensed location of the osteophony speaker.

25. The audio apparatus according to claim 24, wherein the controller is configured to control the audio signal modifier to modify at least one of the first audio signal and the second audio signal to a first modified audio signal if the osteophony speaker is determined to be located inside an ear, and control the audio signal modifier to modify at least one of the first audio signal and the second audio signal to a second modified audio signal if the osteophony speaker is determined to be located outside the ear.

26. A method of providing an audio signal of an audio apparatus, the method comprising:

receiving a first audio signal from an audio source providing apparatus;

outputting the first audio signal through an osteophony speaker;

sensing whether or not the audio apparatus is connected to a glasses apparatus;

stopping the receiving the first audio signal from the audio source providing apparatus and receiving a second audio signal from a display apparatus operating in an interlocked manner with the glasses apparatus, if the audio apparatus is determined to be combined with the glasses apparatus; and outputting the second audio signal through the osteophony speaker when the display apparatus receives call audio from an external user while the display apparatus outputs a contents image, wherein the display apparatus outputs contents audio corresponding to the contents image through a speaker while the audio apparatus outputs the received call audio through the osteophony speaker.

27. The method according to claim 26, wherein the second audio signal received from the display apparatus is an audio signal synchronized with an image displayed in the display apparatus.

28. The method according to claim 26, further comprising:

sensing a location of the osteophony speaker; and modifying one of the first audio signal and the second audio signal according to a location of the sensed osteophony speaker.

29. The method according to claim 28, wherein the modifying modifies one of the first audio signal and the second audio signal to a first modified audio signal if the osteophony speaker is determined to be located inside an ear, and modifies one of the first audio signal and the second audio signal to a second modified audio signal if the osteophony speaker is determined to be located outside the ear.

30. An audio apparatus comprising:

a communicator configured to receive an audio signal from an audio source providing apparatus;

an osteophony speaker configured to output the audio signal;

a combination unit configured to combine the audio apparatus with a hair band; and a controller configured to, when the audio apparatus is combined with the hair band, control to modify the audio signal to a first modified audio signal and output the first modified audio signal through an osteophony speaker of the hair band, and when the audio apparatus is not combined with the hair band, control to modify the audio signal to a second modified audio signal and output the second modified audio signal through the osteophony speaker.

31. A display system comprising:

a display apparatus configured to output contents images and contents audio related to the contents images; and a glasses apparatus configured to receive the contents audio corresponding to contents images, to output the received contents audio to an osteophony speaker, to receive call audio from the display apparatus, and to output the received call audio to the osteophony speaker when the display apparatus receives call audio from an external user while the display apparatus outputs contents images;

wherein the display apparatus outputs the contents audio corresponding to a contents image through a speaker while the glasses apparatus outputs the received call audio through the osteophony speaker.

32. The method of claim 31, wherein the glasses apparatus is shutter glasses for viewing three-dimensional (3D) contents reproduced in the display apparatus.

33. The method of claim 31, wherein the glasses apparatus further comprises a microphone configured to receive a user's voice to control the display apparatus.

34. The method of claim 31, wherein the glasses apparatus comprises an audio apparatus which is detachably attached to the glasses apparatus.

\* \* \* \* \*